(12) United States Patent
Noda et al.

(10) Patent No.: US 10,345,770 B2
(45) Date of Patent: Jul. 9, 2019

(54) POWER DEMAND ESTIMATING APPARATUS, METHOD, PROGRAM, AND DEMAND SUPPRESSING SCHEDULE PLANNING APPARATUS

(71) Applicant: KABUSHIKI KAISHA TOSHIBA, Minato-ku (JP)

(72) Inventors: Hideki Noda, Saku (JP); Koji Toba, Tama (JP); Takashi Morimoto, Ome (JP); Kazuhiko Miyazaki, Fuchu (JP); Noriko Nishimura, Higashiyamato (JP); Takahiro Yamada, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 343 days.

(21) Appl. No.: 14/776,286

(22) PCT Filed: Feb. 20, 2014

(86) PCT No.: PCT/JP2014/053973
§ 371 (c)(1),
(2) Date: Sep. 14, 2015

(87) PCT Pub. No.: WO2014/141841
PCT Pub. Date: Sep. 18, 2014

(65) Prior Publication Data
US 2016/0033949 A1 Feb. 4, 2016

(30) Foreign Application Priority Data

Mar. 15, 2013 (JP) .................................. 2013-054308

(51) Int. Cl.
*G05B 15/02* (2006.01)
*G06Q 50/06* (2012.01)
(Continued)

(52) U.S. Cl.
CPC ........... *G05B 15/02* (2013.01); *G06F 1/3287* (2013.01); *G06Q 10/0631* (2013.01); *G06Q 50/06* (2013.01); *H02J 2003/003* (2013.01)

(58) Field of Classification Search
CPC .... G06Q 10/04; H02J 2003/003; Y04S 10/54; Y04S 20/222; Y04S 20/40; Y04S 20/44;
(Continued)

(56) References Cited

U.S. PATENT DOCUMENTS 5,566,084 A * 10/1996 Cmar ................. G05D 23/1902
700/276
5,689,665 A * 11/1997 Mitsui ................... G06F 3/0481
715/803

(Continued)

FOREIGN PATENT DOCUMENTS

CN 102422311 A 4/2012
CN 102714410 A 10/2012
(Continued)

OTHER PUBLICATIONS

Combined Chinese Office Action and Search Report dated Nov. 4, 2016 in Patent Application No. 201480005578.4 (with English Translation and English Translation of Category of Cited Documents).

(Continued)

*Primary Examiner* — Darrin D Dunn
(74) *Attorney, Agent, or Firm* — Oblon, McClelland, Maier & Neustadt, L.L.P.

(57) ABSTRACT

A power demand estimating apparatus includes a demand data memory, a demand estimator, and a display. The demand data memory stores plural power demand patterns and power demand amount data. The demand estimator selects, from the demand data memory, the demand pattern matching the environmental condition on an estimation day, (Continued)

obtains the maximum value of an power demand amount and the minimum value thereof at an expected temperature on the estimation day, calculates, using those pieces of information, the power demand amount per a unit time on the estimation day, and creates a demand estimating model. The display displays, together with the power demand pattern selected by the demand estimator, the demand estimating model.

11 Claims, 19 Drawing Sheets

(51) Int. Cl.
  *G06Q 10/06* (2012.01)
  *G06F 1/3287* (2019.01)
  *H02J 3/00* (2006.01)
(58) Field of Classification Search
  CPC .............. Y02B 70/3266; Y02B 60/165; Y02B 70/3216; Y02B 90/245; G05B 15/02; G05B 13/026; G05B 2219/2642
  See application file for complete search history.

(56) References Cited

U.S. PATENT DOCUMENTS

| | | | | |
|---|---|---|---|---|
| 6,216,956 B1* | 4/2001 | Ehlers | ............... | F24F 11/006 236/47 |
| 6,577,962 B1* | 6/2003 | Afshari | ............... | G06Q 10/06 700/291 |
| 6,774,506 B2* | 8/2004 | Hashimoto | ............... | H02J 3/14 307/38 |
| 7,836,006 B2* | 11/2010 | Kobayashi | ............... | G06Q 30/02 706/45 |
| 8,738,334 B2* | 5/2014 | Jiang | ............... | G06Q 10/04 700/109 |
| 8,886,477 B2* | 11/2014 | Imahara | ............... | H02J 3/00 702/61 |
| 8,930,033 B2* | 1/2015 | Yang | ............... | H02J 3/14 700/286 |
| 8,983,671 B2* | 3/2015 | Yonezawa | ............... | G06Q 50/06 700/286 |
| 9,286,582 B2* | 3/2016 | Drees | ............... | G06Q 10/06 |
| 9,557,798 B2* | 1/2017 | Sako | ............... | H02J 3/14 |
| 9,563,530 B2* | 2/2017 | Wada | ............... | G01R 21/133 |
| 9,569,804 B2* | 2/2017 | Stein | ............... | G06Q 50/06 |
| 9,727,069 B2* | 8/2017 | Watanabe | ............... | G05F 1/66 |
| 2003/0065560 A1* | 4/2003 | Brown | ............... | G06Q 30/02 705/14.13 |
| 2003/0083788 A1* | 5/2003 | Harada | ............... | G05B 15/02 700/291 |
| 2003/0101009 A1* | 5/2003 | Seem | ............... | H02J 3/00 702/61 |
| 2003/0163224 A1* | 8/2003 | Klaar | ............... | H02J 3/14 700/286 |
| 2005/0015283 A1* | 1/2005 | Iino | ............... | G06Q 10/06315 705/4 |
| 2005/0096797 A1* | 5/2005 | Matsubara | ............... | H02J 3/00 700/291 |
| 2005/0102068 A1* | 5/2005 | Pimputkar | ............... | H02J 3/14 700/291 |
| 2005/0177414 A1* | 8/2005 | Priogin | ............... | G06Q 10/06 706/21 |
| 2006/0167591 A1 | 7/2006 | McNally | | |
| 2007/0010914 A1* | 1/2007 | Johnson | ............... | G06Q 10/06 700/276 |
| 2007/0244604 A1* | 10/2007 | McNally | ............... | G06Q 50/06 700/291 |
| 2008/0046387 A1* | 2/2008 | Gopal | ............... | G01D 4/004 705/412 |
| 2008/0275845 A1* | 11/2008 | Schleimer | ............... | G06Q 10/06 |
| 2009/0055140 A1* | 2/2009 | Kettaneh | ............... | G06Q 30/02 703/2 |
| 2010/0161502 A1* | 6/2010 | Kumazawa | ............... | G06Q 10/06 705/317 |
| 2010/0204845 A1* | 8/2010 | Ohuchi | ............... | H02J 3/14 700/291 |
| 2010/0274402 A1* | 10/2010 | Shaffer | ............... | G06F 9/50 700/291 |
| 2011/0010222 A1* | 1/2011 | Choudhary | ............... | G06Q 10/06 705/7.37 |
| 2011/0068946 A1* | 3/2011 | Sato | ............... | G05B 13/024 340/870.01 |
| 2011/0119113 A1* | 5/2011 | Chatterjee | ............... | G06Q 10/06 705/7.36 |
| 2011/0231028 A1* | 9/2011 | Ozog | ............... | G06Q 10/06 700/291 |
| 2011/0251933 A1* | 10/2011 | Egnor | ............... | G06Q 50/06 705/30 |
| 2011/0273304 A1* | 11/2011 | Pryor | ............... | H04Q 9/00 340/870.01 |
| 2011/0307109 A1* | 12/2011 | Sri-Jayantha | ............... | G06Q 10/04 700/291 |
| 2011/0307112 A1* | 12/2011 | Barrilleaux | ............... | H05B 37/02 700/291 |
| 2012/0010758 A1* | 1/2012 | Francino | ............... | G05B 17/02 700/291 |
| 2012/0078687 A1* | 3/2012 | Ghosh | ............... | G06Q 30/0207 705/14.1 |
| 2012/0083927 A1* | 4/2012 | Nakamura | ............... | G05B 13/026 700/278 |
| 2012/0084063 A1* | 4/2012 | Drees | ............... | G06Q 10/06 703/6 |
| 2012/0095608 A1* | 4/2012 | Murakami | ............... | G06Q 10/04 700/291 |
| 2012/0116600 A1* | 5/2012 | Schmid | ............... | G06F 19/00 700/291 |
| 2012/0239213 A1* | 9/2012 | Nagata | ............... | G06Q 50/06 700/291 |
| 2012/0245868 A1* | 9/2012 | Imahara | ............... | H02J 3/00 702/61 |
| 2012/0278051 A1* | 11/2012 | Jiang | ............... | G06Q 10/04 703/2 |
| 2012/0323382 A1* | 12/2012 | Kamel | ............... | G05F 1/66 700/286 |
| 2013/0144451 A1* | 6/2013 | Kumar | ............... | G05B 13/02 700/291 |
| 2013/0197708 A1* | 8/2013 | Song | ............... | H04Q 9/00 700/295 |
| 2013/0257626 A1* | 10/2013 | Masli | ............... | G08B 13/19613 340/691.6 |
| 2013/0262654 A1* | 10/2013 | Masli | ............... | G06Q 50/06 709/224 |
| 2013/0325377 A1* | 12/2013 | Drees | ............... | G06Q 10/06 702/61 |
| 2014/0058572 A1* | 2/2014 | Stein | ............... | G06Q 50/06 700/291 |
| 2014/0207363 A1* | 7/2014 | Kanno | ............... | G01C 21/3469 701/123 |
| 2014/0282172 A1* | 9/2014 | Bull | ............... | G06Q 10/06 715/771 |
| 2014/0330442 A1* | 11/2014 | Obara | ............... | G06Q 50/06 700/291 |
| 2014/0358314 A1* | 12/2014 | Sako | ............... | H02J 3/32 700/297 |
| 2015/0127179 A1* | 5/2015 | Binding | ............... | H02J 3/28 700/291 |

FOREIGN PATENT DOCUMENTS

| | | |
|---|---|---|
| CN | 102859550 A | 1/2013 |
| JP | 4-372046 A | 12/1992 |
| JP | 5-038051 A | 2/1993 |
| JP | 6-105465 A | 4/1994 |
| JP | 11-346438 A | 12/1999 |
| JP | 2003-087969 A | 3/2003 |

(56) References Cited

FOREIGN PATENT DOCUMENTS

| | | |
|---|---|---|
| JP | 2004-328907 A | 11/2004 |
| JP | 2006-304595 A | 11/2006 |
| JP | 2009-225550 A | 10/2009 |

OTHER PUBLICATIONS

International Search Report dated Apr. 28, 2014, in PCT/JP2014/053973 filed Feb. 20, 2014.
Extended Search Report dated Aug. 1, 2016 in European Patent Application No. 14764454.6.

* cited by examiner

| YEAR | MON-TH | DAY | DAY OF WEEK | SEA-SON | HOLIDAY INFORMA-TION | EVENT INFORMATION |
|---|---|---|---|---|---|---|
| 2013 | 8 | 11 | SUN-DAY | SUMMER | HOLIDAY | — |
| 2013 | 8 | 12 | MON-DAY | SUMMER | WEEKDAY | — |
| 2013 | 8 | 13 | TUES-DAY | SUMMER | WEEKDAY | W-CUP PRELIMINARY GAME |
| 2013 | 8 | 14 | THURS-DAY | SUMMER | WEEKDAY | — |

*Fig. 2*

POWER DEMAND ESTIMATING APPARATUS, METHOD, PROGRAM, AND DEMAND SUPPRESSING SCHEDULE PLANNING APPARATUS

CROSS-REFERENCE TO RELATED APPLICATIONS

This application is based upon and claims the benefit of priority from Japanese Patent Application No. 2013-054308, filed on Mar. 15, 2013, the entire contents of which are incorporated herein by reference.

TECHNICAL FIELD

Embodiments of the present disclosure relate to power demand estimating apparatus, method, program, and a demand suppressing schedule planning apparatus that includes the power demand estimating apparatus.

BACKGROUND

In order to stably supply electrical power, a power demand within the service area of a central power supply instruction center that comprehensively manages the power supply operation is estimated, and the amount of power generation at each power generation plant is determined based on this estimation. Estimation of power demand is generally carried out through a scheme like multiple regression analysis based on the past record of demand in the area subjected to the estimation.

RELATED TECHNICAL DOCUMENTS

Patent Documents

Patent Document 1: JP 2009-225550 A

In recent years, a demand-response is getting attention which promotes a power consumption suppression by giving various incentives to consumers. In the demand-response, it is important to select the incentive menu in accordance with a power demand condition. Hence, it is necessary to estimate not only a power demand in a large-scale area like the service area of the central power supply instruction center, but also a power demand in a smaller-scale area like the service area of a local power supply instruction center.

It is assumed that, however, such a small-scale area has no past record of demand or has a little amount of such records which are necessary for a demand estimation. In such a case, data created by averaging the demand records of the other area and the demand records of the respective areas is utilized as dummy demand record data to create a demand estimating model, but there is always a difference from an actual power demand.

Accordingly, until sufficient amount of demand records at the area subjected to the estimation is obtained, it is necessary to correct the dummy demand record data as needed so as to meet the demand pattern at the area subjected to the estimation. However, the dummy demand record is data indicated by an amount of power demand (kWh) that is an absolute value. Accordingly, it is not easy to quickly understand the relationship between a created demand estimating model and data that is the base for that model.

In addition, when it is clearly assumed that an actual amount of power demand has a difference from the created demand estimating model, although the demand estimating model can be corrected, it is difficult to reflect the correction on the dummy demand record data that is the absolute value.

Hence, it is difficult to enhance the accuracy of the demand estimation.

SUMMARY

Embodiments of the present disclosure have been made to address the aforementioned technical problems, and it is an objective of the present disclosure to provide a power demand estimating apparatus and a power demand estimating method which facilitates understanding to a relationship between a created demand estimating model and data that will be a support thereof, enable a highly accurate demand estimation even if there is no demand record data at an area subjected to the estimation by enabling the easy correction of the support data, and have an excellent user-friendliness.

A power demand estimating apparatus according to embodiments of the present disclosure estimates a power demand on a designated estimation day, and the apparatus includes:
  a demand data memory storing:
    a plurality of power demand patterns which are classified in accordance with an environmental condition, and which show a power demand rate per a unit time; and
    power demand amount data per temperature gathering up a maximum value and a minimum value of a power demand amount at each temperature;
  a demand estimator selecting the demand pattern that matches the environmental condition on the estimation day from the demand data memory, obtaining, the maximum value and the minimum values of the power demand amount at an expected temperature on the estimation day from the power demand amount data per temperature, calculating the power demand amount per a unit time on the estimation day, and creating a demand estimating model on the estimation day; and
  a display displaying the demand estimating model on the estimation day together with the power demand pattern selected by the demand estimator.

In addition, a power demand estimating method according to the embodiments of the present disclosure estimates a power demand on a designated estimation day, and is executed by a computer accessible to a demand data memory storing:
  a plurality of power demand patterns which are classified in accordance with an environmental condition, and which show a power demand rate per a unit time; and
  power demand amount data per temperature gathering up a maximum value and a minimum value of a power demand amount at each temperature,
the method comprising:
  a step of selecting the demand pattern that matches the environmental condition on the estimation day from the demand data memory, obtaining the maximum value and the minimum value of the power demand amount at an expected temperature on the estimation day, calculating the power demand amount per a unit time on the estimation day, and creating a demand estimating model on the estimation day; and
  a step of displaying the demand estimating model on the estimation day together with the power demand pattern selected by the demand estimator.

According to the embodiments of the present disclosure, a program that causes a computer to realize the functions of the above-explained power demand estimating apparatus can be created. This program is stored in a non-transitory storage medium or storage device, such as a flexible disk, a CD-ROM, a magneto-optical disk, a semiconductor memory, or a hard disk. In addition, the program may be distributed in the form of digital signals via a network. Intermediate process results are temporarily stored in the storage device like a main memory.

BRIEF DESCRIPTION OF DRAWINGS

FIG. 2 is a diagram illustrating a structure of a calendar stored in a calendar memory;

FIG. 12A illustrates a demand curve created through an averaging process, while FIG. 12B is a boxplot created through a distribution function process;

FIG. 13A illustrates a demand curve created through an averaging process, while FIG. 13B is a boxplot created through a distribution function process;

DETAILED DESCRIPTION

Several embodiments of a power demand estimating apparatus, a power demand estimating method, and a power demand estimating program will be explained below specifically with reference to the figures.

[1. First Embodiment]

(1-1. Structure)

Figure 1:
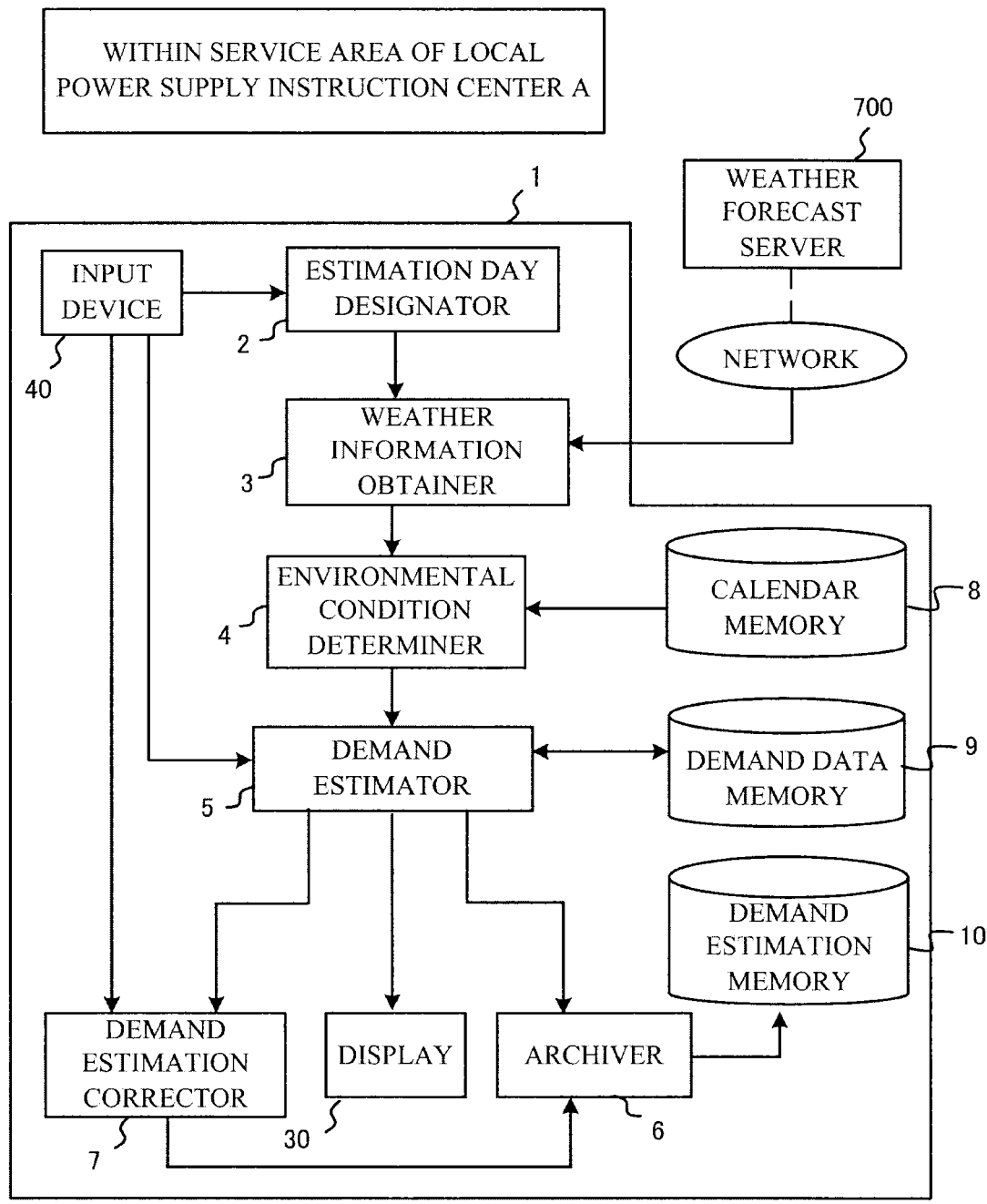
FIG. 1 is a block diagram illustrating a structure of a power demand estimating apparatus according to a first embodiment.

In the service area of a central power supply instruction center that comprehensively manages a power supply operation for a large-scale area, local power supply instruction centers are provided for power supply operations for respective small-scale areas that are divided sections of the large-scale area. As illustrated in FIG. 1, a power demand estimating apparatus 1 performs estimation of a power demand (hereinafter, sometimes simply referred to as "demand estimation") within, for example, the service area of a local power supply instruction center A.

The power demand estimating apparatus 1 includes, as hardware resources, a storage device like an HDD, a CPU, and a main memory. In addition, the power demand estimating apparatus includes a display 30, such as a CRT or a liquid crystal display, and an input device 40 like a mouse and a keyboard.

The display 30 displays a GUI screen for enabling a user to input. The input device 40 is utilized to enable the user to give an input operation, such as a selection of data and a request of a process, through a GUI screen.

The CPU loads a program stored in the storage device on the main memory, thereby realizing the respective structural elements of the power demand estimating apparatus 1 illustrated in FIG. 1 with software, etc. That is, the power demand estimating apparatus 1 includes an estimation day designator 2 that accepts a designation of a day subjected to a demand estimation (hereinafter, sometimes simply referred to as an "estimation day"), a weather information obtainer 3 that obtains, from a weather forecast server 700 through a network, the weather information on the estimation day, an environmental condition determiner 4 that determines the environmental condition on the estimation day, and a demand estimator 5 that estimates a demand by creating a demand estimating model based on the environmental condition on the estimation day.

The power demand estimating apparatus 1 further includes an archiver 6 that stores the demand estimating model created by the demand estimator 5 in a demand estimation memory 10 to be discussed later, and a demand estimation corrector 7 that corrects the created demand estimating model based on an input from the user.

Still further, the power demand estimating apparatus 1 includes an input/output controller (unillustrated) that accepts controls to the above-explained respective structural elements, output of various data to the display 30, and input from the input device 40. Those structural elements may be realized by hardware resources that are a combination of electronic components.

Yet still further, the power demand estimating apparatus 1 includes a calendar memory 8 that stores, for each future day subjected to a demand estimation, a calendar indicating a season, a day of week, etc., a demand data memory 9 that stores power demand data utilized to create the demand estimating model, and the demand estimation memory 10 that stores the created demand estimating model as the demand estimation for the estimation day. Those memories are secured in the memory area of the storage device. Alternatively, those memories may be built in an external server, and may be connected to the power demand estimating apparatus 1 via a network.

The estimation day designator 2 accepts a designation of the estimation day from the user through the input device 40.

The estimation day may be automatically designated in accordance with a demand estimating schedule programmed in advance.

The weather information obtainer 3 obtains, from the external weather forecast server 700 via the network, the weather information on the estimation day designated by the estimation day designator 2. The weather information contains, for example, weather information, such as sunny or rainy, and temperature information, such as an expected highest temperature or an expected lowest temperature. In addition, the weather information may contain information, such as a humidity and an amount of solar light.

The environmental condition determiner 4 determines the environmental condition of the estimation day. In this case, the "environmental condition" can be defined by a "season", a "type of day", and "weather". Depending on those classifications, the power demand pattern remarkably varies. Hence, the environmental condition is a necessary condition to determine the type of the demand pattern estimated on the estimation day.

The "weather" has at least four types that are "spring", "summer", "autumn", and "winter". Each time period among those types can be set as needed in accordance with the weather of the area subjected to the demand estimation. For example, a time period between April to June can be set as "spring", a time period between July to September can be set as "summer", a time period between October to December can be set as "autumn", and a time period between January to March can be set as "winter".

The "type of day" includes at least two types that are "weekday" and "non-work day and holiday". For example, days between Monday to Friday except a holiday can be set as "weekdays", and Saturday, Sunday, and a holiday can be set as "non-work day and holiday". It can be expected that, in an area where a large number of factories and office buildings are present, the power demand is high at "weekdays", and is low at "weekday and holiday".

As the "type of day", in addition to the above-explained "weekday" and "non-work day and holiday", a type "particular day" may be added. The "particular day" means a day at which a large-scale event that affects the power demand is held. Example such a large-scale even is Olympic or World Cup. When, for example, a World Cup game is televised in the night, it is expected that the power demand in the night becomes remarkably high.

The "weather" has at least three types that are "sunny", "rainy", and "cloudy". In addition, a special type of weather, such as "typhoon" or "foggy", may be added.

As illustrated in FIG. 2, the calendar memory 8 stores, for a future date subjected to a demand estimation, a calendar that indicates information on a season, a day of week, and weekday and holiday, and information on the above-explained large-scale event.

The environmental condition determiner 4 refers to the weather information obtained by the weather information obtainer 3, and determines the "weather" of the estimation day. In addition, the environmental condition determiner refers to the calendar stored in the calendar memory 8 based on the estimation day designated by the estimation day designator 2, and determines the "season" and "type of day" of the estimation day.

When, for example, the estimation day is "Aug. 14, 2013", and the weather information is "rainy", the environmental condition determiner 4 determines the environmental condition on the estimation day as "season: summer", "type of day: weekday", and "weather: rainy".

Figure 3:
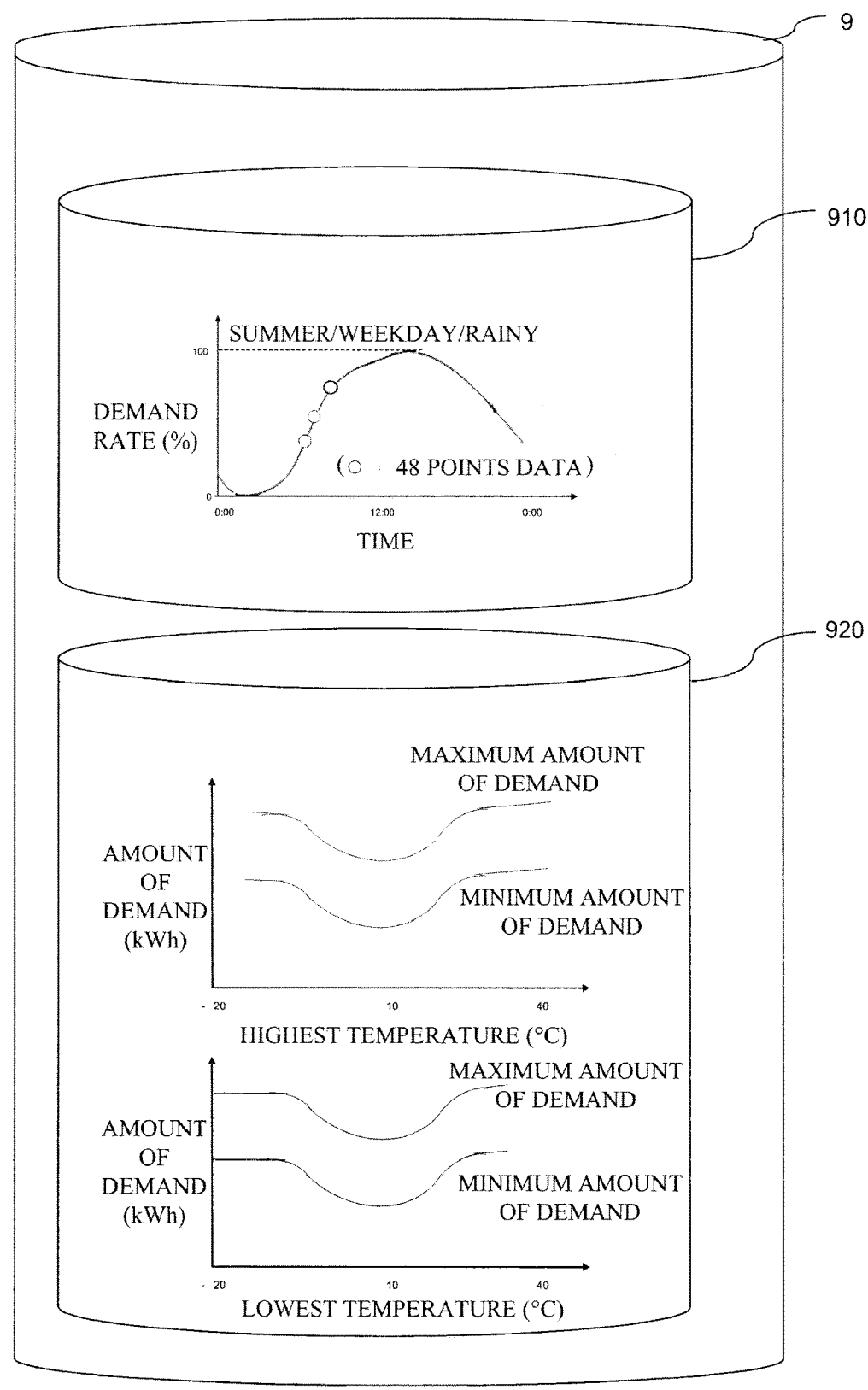
FIG. 3 is a diagram illustrating data stored in a demand data memory.

As illustrated in FIG. 3, the demand data memory 9 stores at least two types of data:

Plural power demand patterns 910 which are classified in accordance with the environmental condition, and which show a power demand rate per a unit time (hereinafter, simply referred to as a "power demand pattern"); and Power demand amount data per temperature 920 that gathers up the maximum value and minimum value of the power demand amount at each temperature (hereinafter, simply referred to as a "power demand amount data per temperature 920").

The power demand pattern 910 is data which is created by relativizing the power demand amount per a unit time for each predetermined time period, and which shows the transition in the power demand rate within the predetermined time period. The unit time can be set as, for example, 30 minutes. The predetermined time period can be set as, for example, a day. The peak power demand in a day is indicated as the power demand rate 100%, and the bottom power demand is indicated as the power demand rate 0%.

The power demand shows a different pattern in accordance with the environmental condition, such as the season, the type of day, or the weather, and thus the demand data memory 9 stores the plural power demand patterns 910 classified in accordance with those conditions.

The power demand amount data per temperature 920 shows, as absolute values (kWh), the maximum value and minimum value of the power demand amount at each temperature. Even if the temperature is the same, when such a temperature is the highest temperature or is the lowest temperature, there is a difference in the demand amount, and thus data is collected up separately for the highest temperature and for the lowest temperature.

Those pieces of data can be created beforehand based on the demand record measured in past. As for the past demand record to be applied, if there is a demand record within the service area of the local power supply instruction center A, the reliability is high. When, however, there is no demand record within the service area of the local power supply instruction center A or when the amount of accumulated data is little, by applying a demand record of an area that possibly shows a relatively similar demand pattern to the service area of the power supply instruction center A, a demand pattern that has a certain level of reliability can be created. For example, the demand pattern can be created based on the past demand record within the whole service area of the central power supply instruction center that comprehensively manages the local power supply instruction centers A.

The power demand pattern 910 can be created as follow. For example, as a predetermined demand record, the power demand amount within the service area of the central power supply instruction center is measured for a predetermined time period and for each 30 minutes. In this case, there is data that gathers up the measured values in a unit of a day. This data contains the weather information at the measurement time.

This data is classified in a group that shows a typical demand pattern in accordance with the above-explained environmental condition. First, in accordance with the season at the time of measurement, the "season" is classified into any one of "spring", "summer", "autumn", and "winter".

In accordance with the day of week at the time of measurement, the "type of day" is classified into either one of "weekday" or "non-work day and holiday". In this case, as needed, the classification "particular day" may be added. Still further, the "weather" is classified into at least any one of "sunny", "rainy", and "cloudy". Hence, the demand record can be classified into at least 24 groups.

Figure 4A:
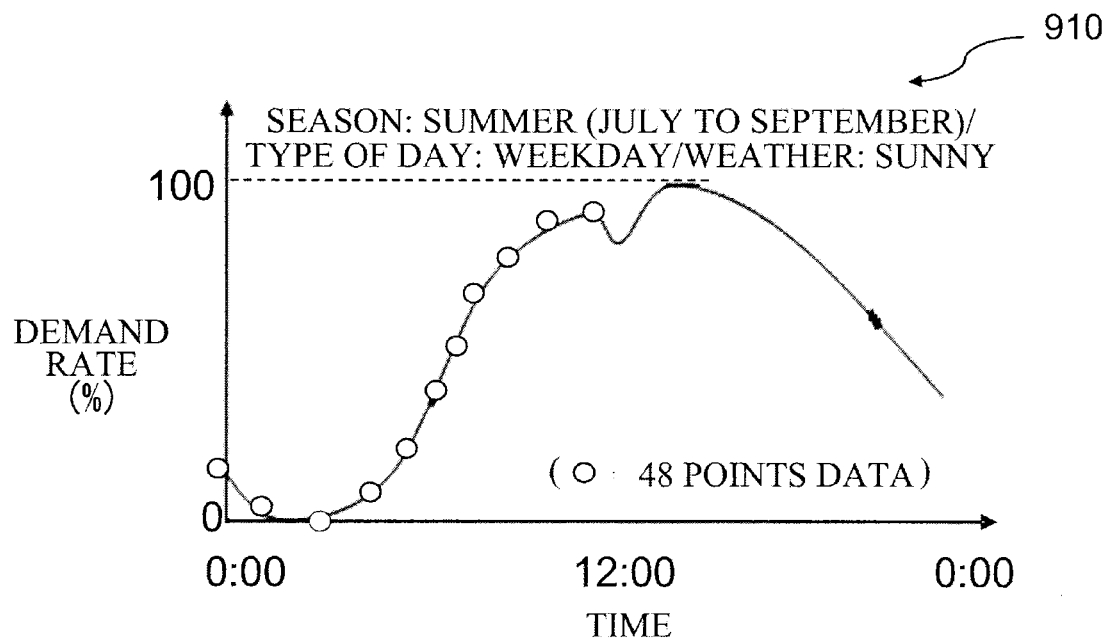
FIGS. 4A and 4B are each a diagram illustrating an example power demand pattern stored in the demand data memory.
Figure 4B:
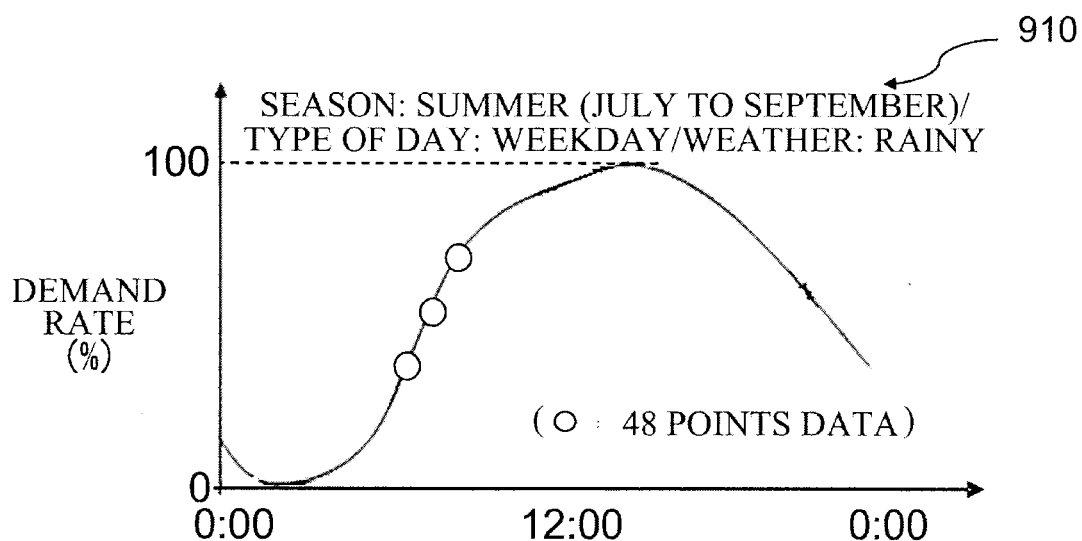

Yet still further, an average value of the amounts of demand per a unit time is obtained for each group. Next, the peak demand amount of a day is set as the demand rate 100%, and the bottom demand amount is set as the demand rate 0%. Subsequently, the demand rate of each demand amount between those values is obtained with reference to those values. Hence, as illustrated in FIGS. 4A and 4B, a demand curve that shows a transition of the power demand rate of a day can be created. When the unit time is 30 minutes, a demand curve that links a total of 48 demand rate points is created. The power demand pattern 910 created in this way is stored in the demand data memory 9.

FIG. 4A illustrates an example demand pattern created in accordance with the environmental conditions that are "season: summer", "type of day: weekday", and "weather: sunny". FIG. 4B illustrates an example demand pattern created in accordance with the environmental conditions that are "season: summer", "type of day: weekday", and "weather: rainy".

Conversely, the power demand amount data per temperature 920 is created as follow. As a predetermined demand record, the power demand amount within the service area of the central power supply instruction center is measured for a predetermined time period and for each 30 minutes. In this case, there is data that collects up the measured values in a unit of day. This data contains the highest temperature and lowest temperature of each day.

Figure 5:
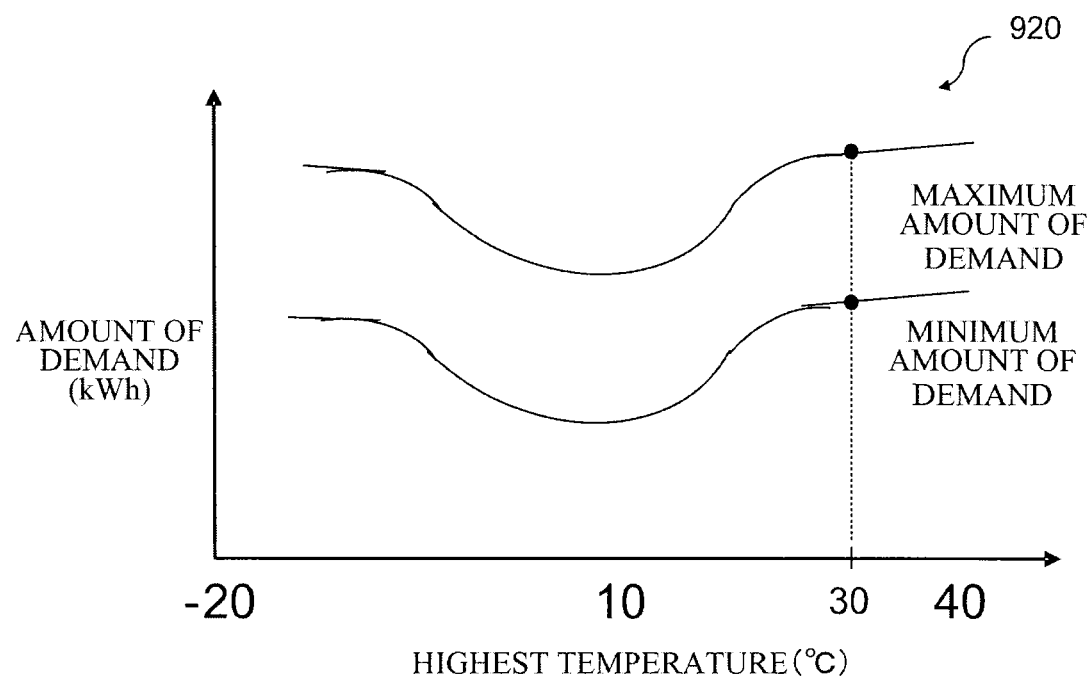
FIG. 5 is a diagram illustrating example temperature-by-temperature power demand amount data stored in the demand data memory.
Figure 5:
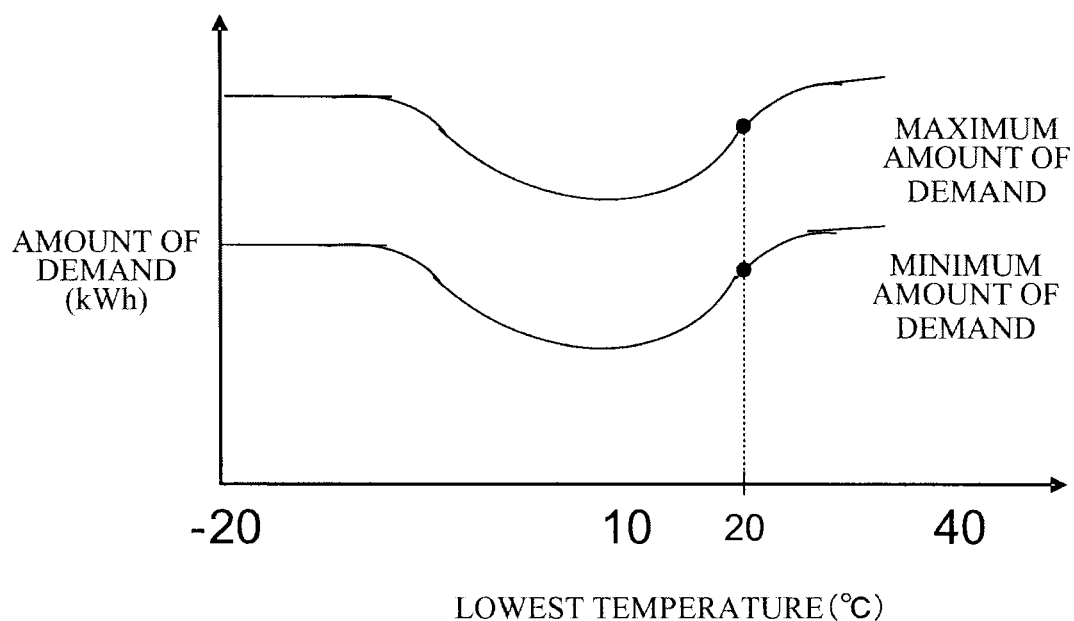

First, the highest temperature of each day and the maximum demand amount and minimum demand amount of that day are extracted. When there is a day at which the highest temperature is the same but the demand amount is different, an average value of the amounts of demand of each day is obtained. Alternatively, the larger value may be selected for the maximum demand amount, and the smaller value may be selected for the minimum demand amount. Next, the maximum demand amount and minimum demand amount at each temperature are linked up, thereby creating the demand curve that shows the power demand amount temperature by temperature. Likewise, the lowest temperature of each day and the maximum demand amount and minimum demand amount of that day are extracted, and the demand curve that shows the power demand amount temperature by temperature is created. Hence, as illustrated in FIG. 5, the power demand amount data per temperature 920 is created.

Figure 6:
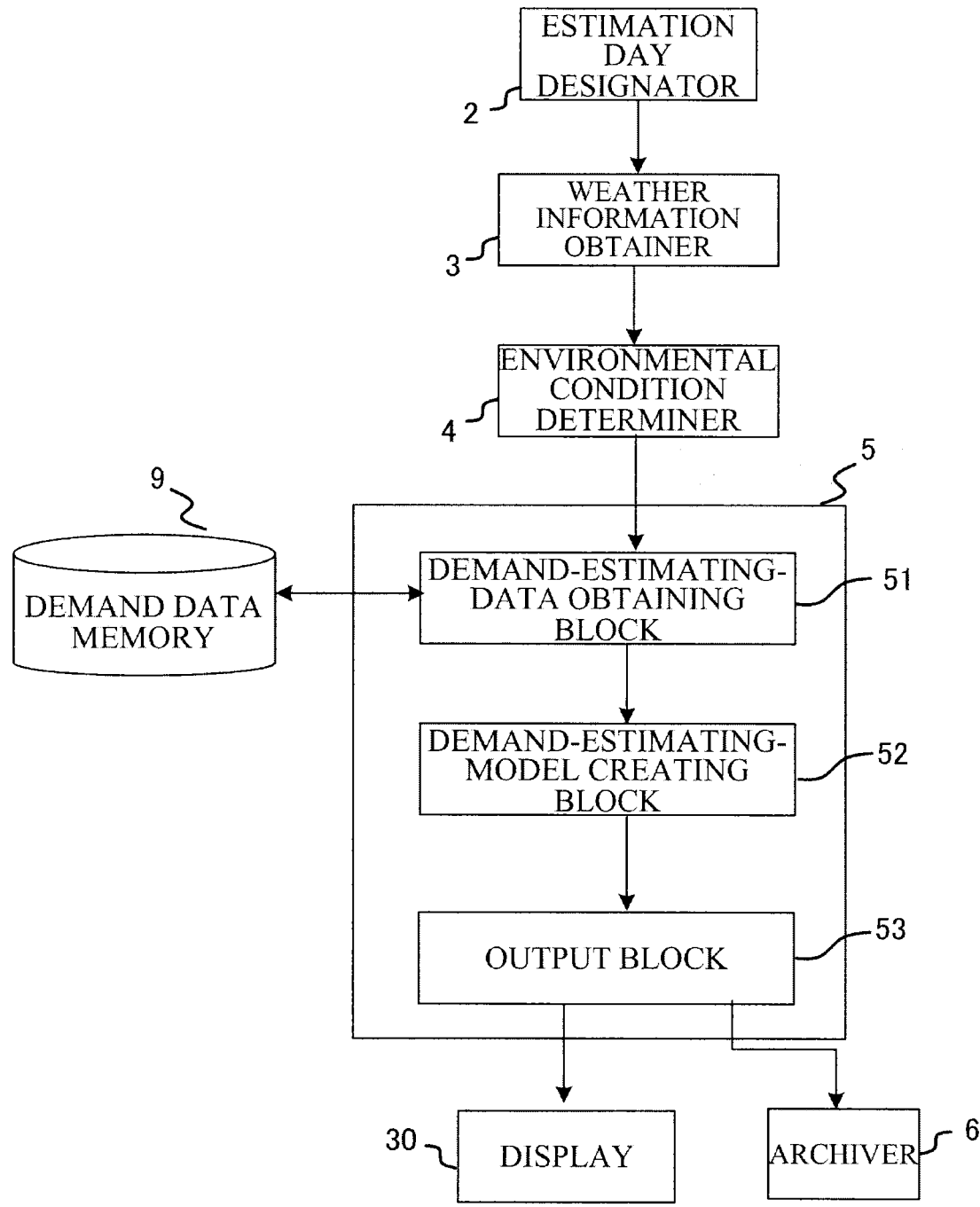
FIG. 6 a block diagram illustrating a structure of a demand estimator.

As illustrated in FIG. 6, the demand estimator 5 includes a demand-estimating-data obtaining block 51, a demand-estimating-model creating block 52, and an output block 53. The demand-estimating-data obtaining block 51 obtains various data necessary for demand estimation. More specifically, this block obtains the designation information of the estimation day from the estimation day designator 2, and also obtains the environmental conditions on the estimation day from the environmental condition determiner 4. In addition, the weather information on the estimation day is obtained from the weather information obtainer 3. Still further, the demand-estimating-data obtaining block obtains, from the demand data memory 9, data corresponding to the environmental condition on the estimation day and the weather information thereon.

More specifically, the power demand pattern 910 that matches the environmental conditions of the estimation day is selected and obtained among the plural power demand patterns 910 stored in the demand data memory 9. When, for example, the environmental conditions that are "season: summer", "type of day: weekday", and "weather: rainy" are obtained from the environmental condition determiner 4, the demand pattern 910 created in accordance with the environmental conditions that are "season: summer", "type of day: weekday", and "weather: rainy" and illustrated in FIG. 4B is selected and obtained.

In addition, the demand-estimating-data obtaining block 51 obtains the maximum power demand amount and the minimum power demand amount at the expected temperature in the weather information on the estimation day from the power demand amount data per temperature 920 stored in the demand data memory 9. The expected temperature is the "highest temperature" or the "lowest temperature". Hence, the demand-estimating-data obtaining block 51 obtains a total of four power demand amounts.

For example, the expected highest temperature is 30° C., and the demand-estimating-data obtaining block 51 obtains the maximum power demand amount and the minimum power demand amount at 30° C. from data gathering up the highest temperature. Likewise, when the expected lowest temperature is 20° C., the demand-estimating-data obtaining block 51 obtains the maximum power demand amount and the minimum power demand amount at 20° C. from data gathering up the lowest temperature.

The demand-estimating-model creating block 52 creates the demand estimating model using the data obtained by the demand-estimating-data creating block 51. More specifically, to each point of the power demand pattern 910 indicated by the demand rate that is an absolute value, a demand amount that is an absolute value calculated from the maximum power demand amount and the minimum power demand amount is allocated.

The demand-estimating-data obtaining block 51 obtains four power demand amounts, but it is appropriate if two of those amounts are applied to create the demand estimating model. The maximum value of the four amounts of demand is allocated to the demand rate 100% that indicates a peak of a day in the power demand pattern 910. Likewise, the minimum value of the four amounts of demand is allocated to the demand rate 0%.

When, for example, the expected highest temperature is 30° C. and the expected lowest temperature is 20° C., as illustrated in FIG. 5, the maximum demand amount at 30° C. that is the maximum value in the four points is allocated to the demand rate 100%. In addition, the minimum demand amount at 20° C. that is the minimum value in the four points is allocated to the demand rate 0%.

As for the remaining portions of the power demand pattern 910, the power demand amount that is an absolute value is calculated in accordance with the demand rate per a unit time and with reference to the demand rate 100% or the demand rate 0%. In the demand pattern illustrated in FIG. 4A, first, the power demand amounts at two points among the 48 points are defined based on data on the maximum demand amount and data on the minimum demand amount. As for the remaining 46 points, the demand rate at each point is multiplied by the maximum demand amount or the minimum demand amount to calculate the power demand amount.

By linking the power demand amounts per a unit time calculated in this way, the demand estimating model that shows the demand curve on the estimation day can be created.

The output block 53 outputs the demand estimating model created by the demand-estimating-model creating block 52, the power demand pattern 910 and the power demand mount data per temperature 920 both obtained by the demand-estimating-data obtaining block 51 to create that demand estimating model, and displays those data as a current estimation screen 31 on the display 30.

Figure 7:
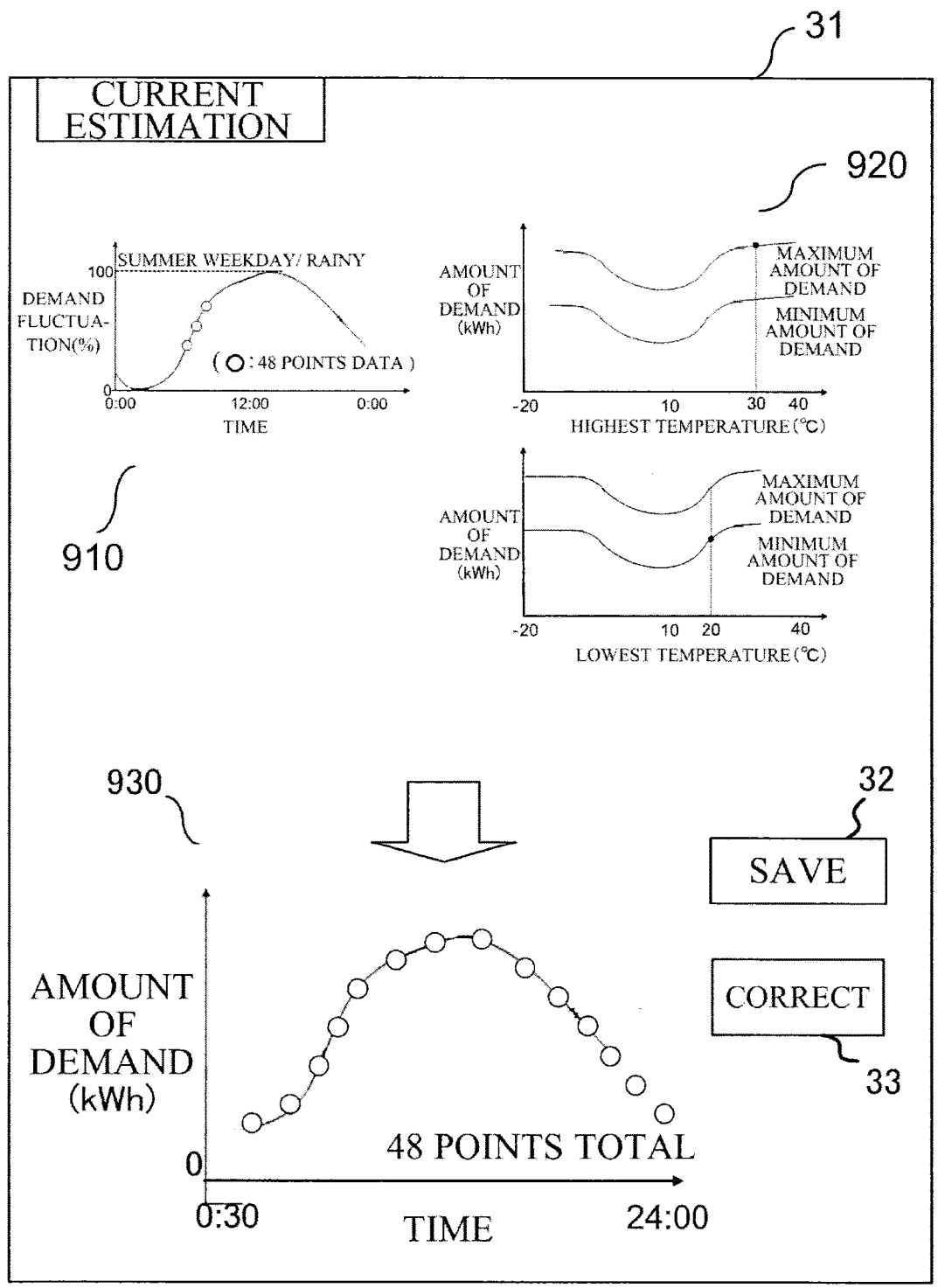
FIG. 7 is a diagram illustrating an example current estimation screen.

FIG. 7 illustrates an example current estimation screen 31. In the current estimation screen 31, the power demand pattern 910 and the power demand amount data per temperature 920 are disposed side by side with the demand estimating model 930 so as to clarify for the user that those pieces of information are the data supporting the demand estimation.

The power demand pattern 910 and the power demand amount data per temperature 920 are displayed in the form of a graph, respectively. As for the power demand pattern 910, by simultaneously displaying the environmental conditions that classify this power demand pattern 910, it becomes easy for the user to understand the meaning of the demand estimation result and the support thereof. As for the power demand amount data per temperature 920, simultaneously displayed are the expected highest temperature, the expected lowest temperature, and the maximum value and the minimum value utilized to create the demand estimating model among the four power demand amounts obtained by the demand-estimating-data obtaining block 51. This also facilitates the user to understand the meaning of the demand estimation result and the support thereof. As for the maximum value of the power demand amount and the minimum value thereof, those values may be displayed in the form being marked on the graph.

A save button 32 and a correct button 33 are disposed in the current estimation screen 31. When the user who checks the current estimation screen 31 determines that it is unnecessary to correct the demand estimating model 930, the save button 32 is depressed through the input device 40. In accordance with the depressed save button 32, the archiver 6 stores, in the demand estimation memory 10, the demand estimating model 930 displayed on the current estimation screen 31 as the demand estimation on the estimation day.

Conversely, when the user who checks the current estimation screen 31 determines that it is necessary to correct the demand estimating model 930, the correct button 33 is depressed through the input device 40. For example, in the case of the power demand pattern 910 displayed on the current estimation screen 31 and illustrated in FIG. 7, the power consumption is increasing without a fall at a time around 12:00. However, when there are plural large-scale facilities within the service area of the local power supply instruction center A, it can be expected beforehand that the power demand falls due to the suspension of the lines around 12:00 since it is a lunch hour. In such a case, it is necessary to correct the demand estimating model 930.

As for the power demand amount data per temperature 920, also, when, for example, the humidity on the estimation day is quite high, and it is clear that, due to this humidity, the power demand amount exceeds the maximum demand amount in the power demand amount data per temperature 920, the demand amount data can be corrected as needed.

Figure 8:
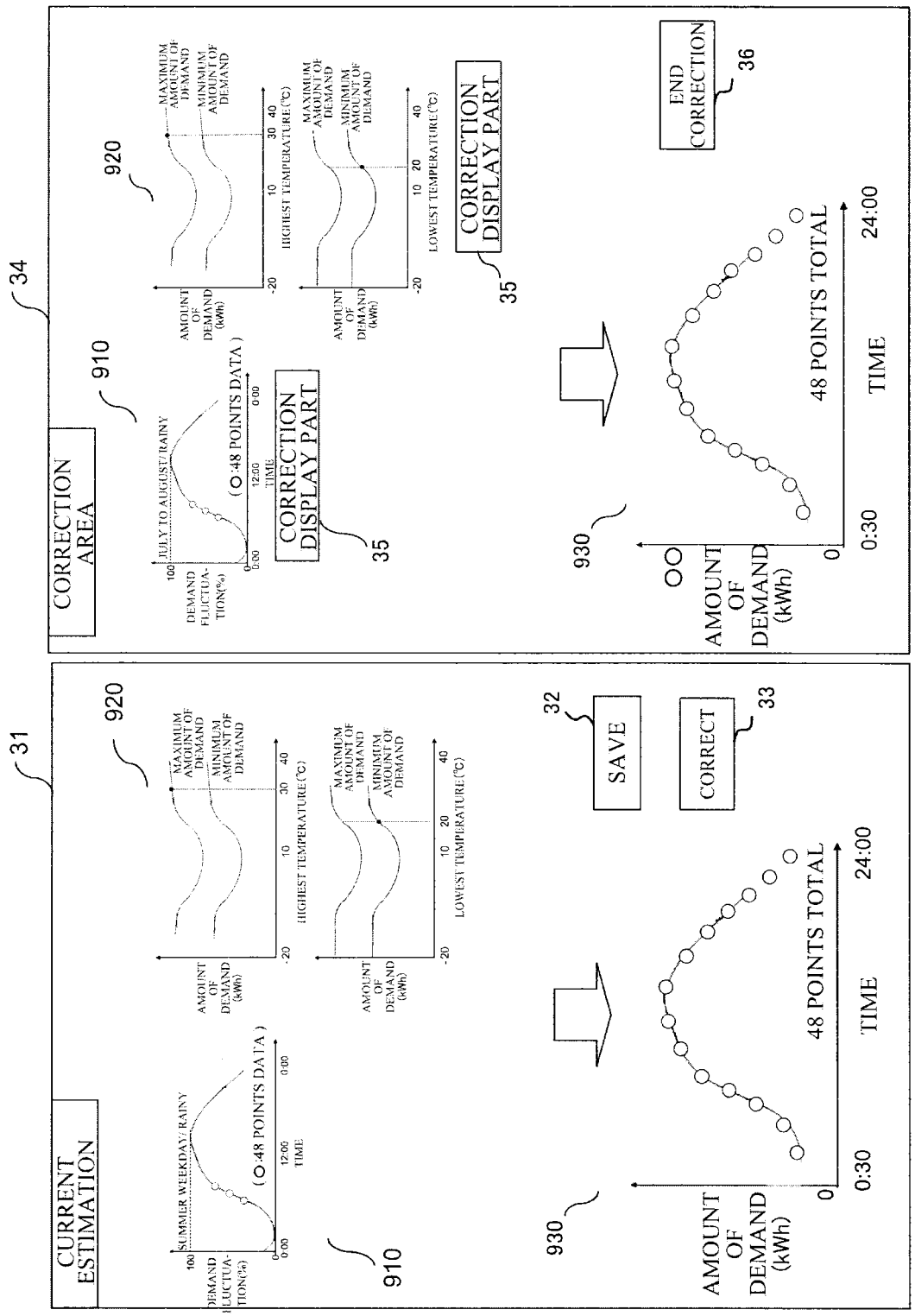
FIG. 8 is a diagram illustrating example current estimation screen and correction area screen.
Figure 9:
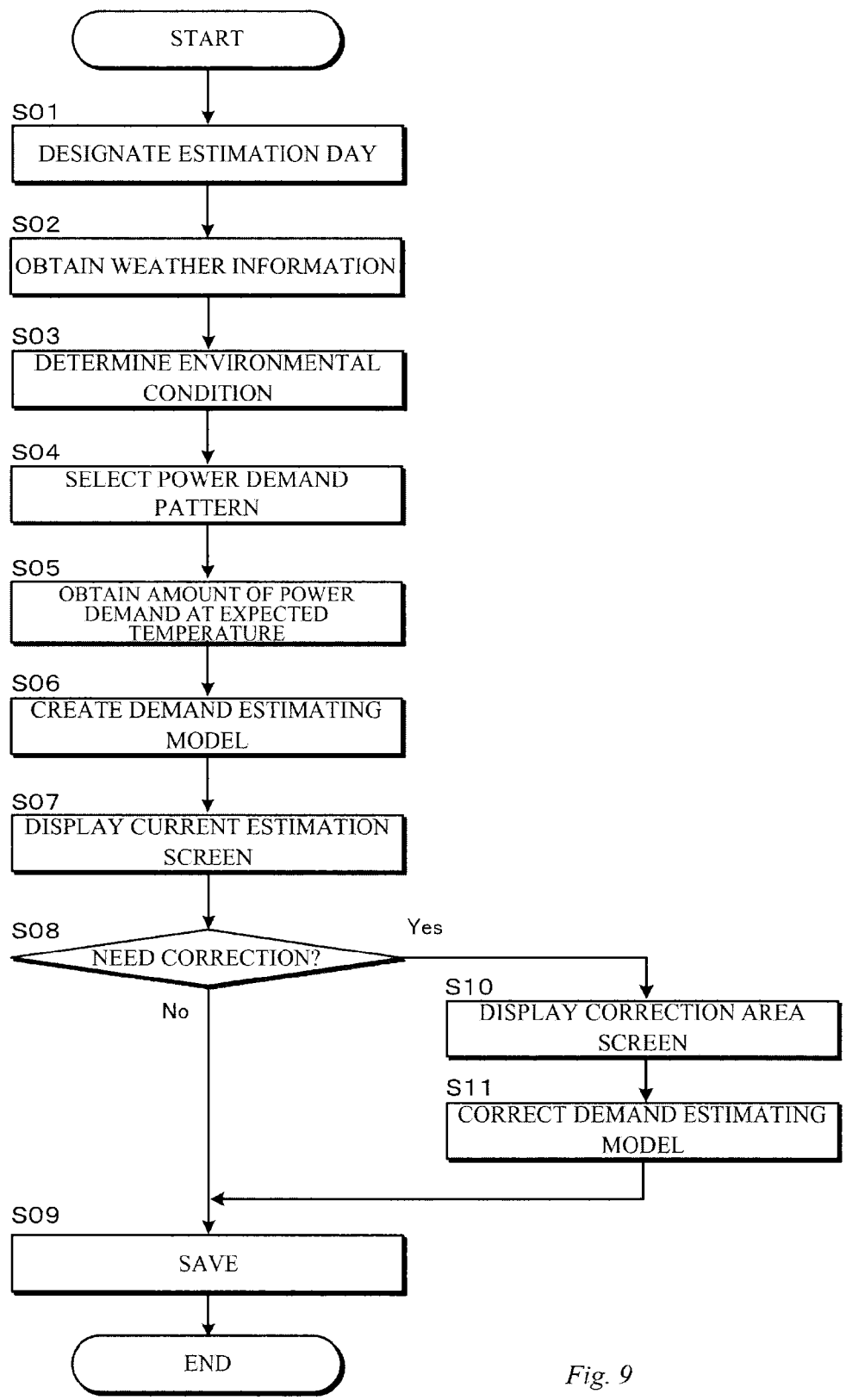
FIG. 9 is a flowchart illustrating a demand-estimating-model creating and correcting process.

The demand estimation corrector 7 copies the details of the current estimation screen 31 in accordance with the depressed correct button 33, and displays, on the display 30, a correction area screen 34 for a correcting process. FIG. 8 illustrates an example correction area screen 34. The correction area screen 34 may be displayed side by side with the current estimation screen 31 so as to clarify for the user the corrected part from the current estimation.

In the correction area screen 34, the demand estimating model 930, the power demand pattern 910 and the power demand amount data per temperature 920 all displayed in the current estimation screen 31 are disposed in the same way as those of the current estimation screen 31. The demand estimating model 930 is corrected by correcting the power demand pattern 910 or the power demand mount data per temperature 920, and creating again the demand estimating model 930 based on the corrected data.

The power demand pattern 910 or the power demand amount data per temperature 920 can be corrected by the user who clicks a part of the graph that the user wants to correct through a mouse, and drags the clicked part up and down in accordance with a desired amount of correction. In the correction area screen 34, a correction display part 35 is disposed below each of the power demand pattern 910 and the power demand amount data per temperature 920, and an amount of correction in accordance with a drag level of the mouse is displayed. Note that the amount of correction can be designated by the user who directly inputs the amount of correction through a keyboard after clicking the correction part.

For example, when, in a section where there are plural factories, it is expected that the power demand around 12:00 falls by 30% in comparison with that of the peak time based on general statistical data, the power demand rate of the power demand pattern 910 around 12:00 is corrected to 70%.

The demand estimation corrector 7 creates again the demand estimating model based on the corrected power demand pattern 910 or power demand amount data per temperature 920 through the same way as the creating process of the demand estimating model 930 by the demand estimator 5.

The demand estimation corrector 7 displays, instead of the demand estimating model 930 before the correction, the re-created demand estimating model 930 on the correction area screen 34. A correction end button 36 is disposed in the correction area screen 34. When the user who checks the correction area screen 34 determines that the correction detail to the demand estimating model 930 is proper, the save button 32 is depressed through the input device 40. In accordance with the depressed correction end button 36, the archiver 6 stores, in the demand estimation memory 10, the demand estimating model 930 displayed on the correction area screen 34 as the demand estimation at the estimation day.

A data update button is also disposed in the correction area screen 34. When the user determines that the correction detail in the correction area screen 34 should be applied to the following demand estimation, the data update button is depressed through the input device 40. In accordance with the depressed data update button, the demand estimation corrector 7 overwrites the conventional power demand pattern or power demand amount data per temperature 920 stored in the demand data memory 9 with the corrected power demand pattern or power demand amount data per temperature 920, thereby updating the data.

When the data is corrected based on an event that is held only on the estimation day, it is unnecessary to reflect the correction detail to the following demand estimation, and thus the data update button is not depressed, and the correction detail is not cleared.

A message to the effect that "update power demand data?" and a "Yes" button and a "No" button may be displayed together with the depression of the correction end button 36 instead of the data update button. When the "Yes" button is depressed, the power demand pattern 910 or the power demand amount data per temperature 920 is updated, and when the "No" button is depressed, the correction detail is cleared.

(1-2. Action)

An action of the power demand estimating apparatus 1 that employs the above-explained structure will be explained. The estimation day designator 2 designates (step S01) the day subjected to a demand estimation. In this case, for example, Aug. 14, 2013, is designated as the estimation day.

The weather information obtainer 3 obtains (step S02), from the weather information database via the network, the weather information on the estimation day designated by the estimation day designator 2. For example, the following information is obtained as the weather information on Aug. 14, 2013.

"Weather: rainy, expected highest temperature: 30° C., and expected lowest temperature: 20° C."

The environmental condition determiner 4 refers to the weather information obtained by the weather information obtainer 3, and the calendar stored in the calendar memory 8, and determines (step S03) the environmental conditions on the estimation day. For example, the environmental conditions on Aug. 14, 2013 are determined as follow.

"Season: summer, type of day: weekday, and weather: rainy"

The demand estimator 5 selects and obtains (step S04), from the demand data memory 9, the power demand pattern that matches the weather obtained by the weather information obtainer 3, and the environmental condition determined by the environmental condition determiner 4.

In this case, as the power demand pattern 910 that matches the weather and environmental conditions on Aug. 14, 2013, the demand pattern data classified into "season: summer, type of day: weekday, and weather: rainy" as illustrated in FIG. 4B is selected.

The demand-estimating-data obtaining block 51 of the demand estimator 5 obtains, from the power demand amount data per temperature 920 stored in the demand data memory 9, the power demand amount at the expected temperature on the estimation day obtained by the weather information obtainer 3. More specifically, the demand-estimating-data obtaining block obtains (step S05), for each of the expected highest temperature and the expected lowest temperature, the maximum power demand amount and the minimum power demand amount.

In this case, the maximum power demand amount and the minimum power demand amount are obtained for each of the expected highest temperature 30° C. and the expected lowest temperature 20° C. on Aug. 14, 2013.

The demand-estimating-model creating block 52 of the demand estimator 5 allocates the maximum value among the obtained four power demand amounts to the demand rate 100% of the power demand pattern 910 obtained in the step S04, and allocates the minimum value to the demand rate 0%. As for the remaining times, the demand amount is calculated in accordance with the demand rate at each time with reference to the maximum demand amount or the minimum demand amount, thereby creating (step S06) the demand estimating model on the estimation day.

In this case, the maximum demand amount at the expected highest temperature 30° C. becomes the estimated demand amount at 2:30 PM which shows the demand rate 100%. In addition, the minimum demand amount at the expected highest temperature 20° C. becomes the estimated demand amount at 3:00 AM which shows the demand rate 0%.

The output block 53 of the demand estimator 5 outputs, together with the power demand pattern 910 and the power demand amount data per temperature 920 selected to create the demand estimating model, the demand estimating model 930 created by the demand-estimating-model creating block 52, and displays (step S07) as the current estimation screen 31 on the display 30.

When the user who checks the current estimation screen 31 determines (step S08: NO) that it is unnecessary to correct the created demand estimating model 930, the archiver 6 stores (step S09) the demand estimating model 930 in the demand estimation memory 10.

When the user who checks the current estimation screen 31 determines (step S08: YES) that it is necessary to correct the created demand estimating model 930, the demand estimation corrector 7 displays (step S10) the correction area screen 34 that is the copy of the details of the current estimation screen 31 on the display 30.

When the power demand pattern 910 or the power demand amount data per temperature 920 is corrected by the user through the input device 40, the demand estimation corrector 7 creates again the demand estimating model 930 based on the corrected power demand pattern 910 or power demand amount data per temperature 920, thereby correcting (step S11) the demand estimating model 930.

After the completion of correction, the demand estimation corrector 7 stores (step S09) the corrected demand estimating model 930 in the demand estimation memory 10. In addition, the conventional power demand pattern 910 or power demand amount data per temperature 920 stored in the demand estimation memory 10 is overwritten with the corrected power demand pattern 910 or power demand amount data per temperature 920 as needed, thereby updating the data.

(1-3. Effects)

(1) As explained above, the power demand estimating apparatus 1 of this embodiment includes the demand data memory 9 that stores the plural power demand patterns 910 classified in accordance with the environmental condition and showing the power demand rate per a unit time, and, the power demand amount data per temperature 920 that gathers up the maximum value and minimum value of the power demand amount for each temperature. The power demand estimating apparatus estimates the power demand on the estimation day based on those pieces of data. That is, the demand estimator 5 selects the power demand pattern 910 in accordance with the environmental condition of the estimation day from the demand data memory 9, obtains the maximum value and minimum value of the power demand amount at the expected temperature on the estimation day from the power demand amount data per temperature 920, and calculates the power demand amount at each time for the power demand amount on the estimation day using those pieces of data. The demand estimating model 930 on the estimation day created in this way is displayed on the display 30 together with the power demand pattern 910 selected by the demand estimator 5.

The demand estimating model 930 is created in this way using the power demand pattern 910 classified in accordance with the environmental condition, and the created demand estimating model 930 is displayed together with the power demand pattern 910. This facilitates the user to easily view the meaning of the demand estimation result and the support thereof. In addition, since the power demand pattern 910 is indicated as the demand rate obtained by relativizing the demand amount which is the absolute value, a correction of reflecting statistical data based on a general rate is easy. Therefore, the power demand estimating apparatus 1 of this embodiment can present a demand estimation which is easy to understand for the user and which is in the form easily correctable even if there is no demand record at the area subjected to the estimation or there is little amount demand record, resulting in an excellent reliability and user friendliness.

(2) The environmental conditions applied for the classification of the power demand pattern 910 are defined by a classification that facilitates an estimation of the tendency of the demand fluctuation, such as a season, a type of day including a weekday or a non-work day, and a weather. In addition, the environmental conditions of the power demand pattern 910 selected by the demand estimator 5 may be displayed on the display 30 together with the power demand pattern 910. This further facilitates the user to understand the meaning of the demand estimation result and the support thereof, improving the user-friendliness.

(3) The power demand amount data per temperature 920 may be displayed on the display 30 together with the demand estimating model 930 on the estimation day and the power demand pattern 910 selected by the demand estimator 5. This further facilitates the user to understand the meaning of the demand estimation result and the support thereof.

(4) The power demand estimating apparatus 1 further includes the demand estimation corrector 7 that corrects the demand estimating model 930 created by the demand estimator 5. The demand estimation corrector 7 corrects the demand estimating model 930 by correcting the power demand pattern 910 displayed on the display 30 based on an input from the user.

The demand estimating model is not directly corrected, but the power demand pattern 910 that is created based on the power demand rate on which general data can be easily reflected, and the demand estimating model result on the estimation day is created again using the corrected power demand pattern 910. Hence, it is easy to precisely correct the demand estimating model, and thus the reliability and user-friendliness of the power demand estimating apparatus 1 can be further improved.

(5) The power demand pattern 910 corrected by the demand estimation corrector 7 may be stored in the demand data memory 9. This enables corrected data to be utilized for the next demand estimation, improving the accuracy of the demand estimation. Hence, the demand can be estimated highly reliably even if there is little demand amount record.

[2. Second Embodiment]

Next, a second embodiment will be explained. In the embodiments from the second embodiment, only the difference from the above-explained embodiment will be explained, and the same part will be denoted by the same reference numeral, and the duplicated detailed explanation thereof will be omitted.

In this embodiment, an explanation will be given of an example case in which, when the demand record of the area subjected to a demand estimation is obtained, demand data is created from such a demand record, and data stored in the demand data memory 9 is updated.

Figure 10:
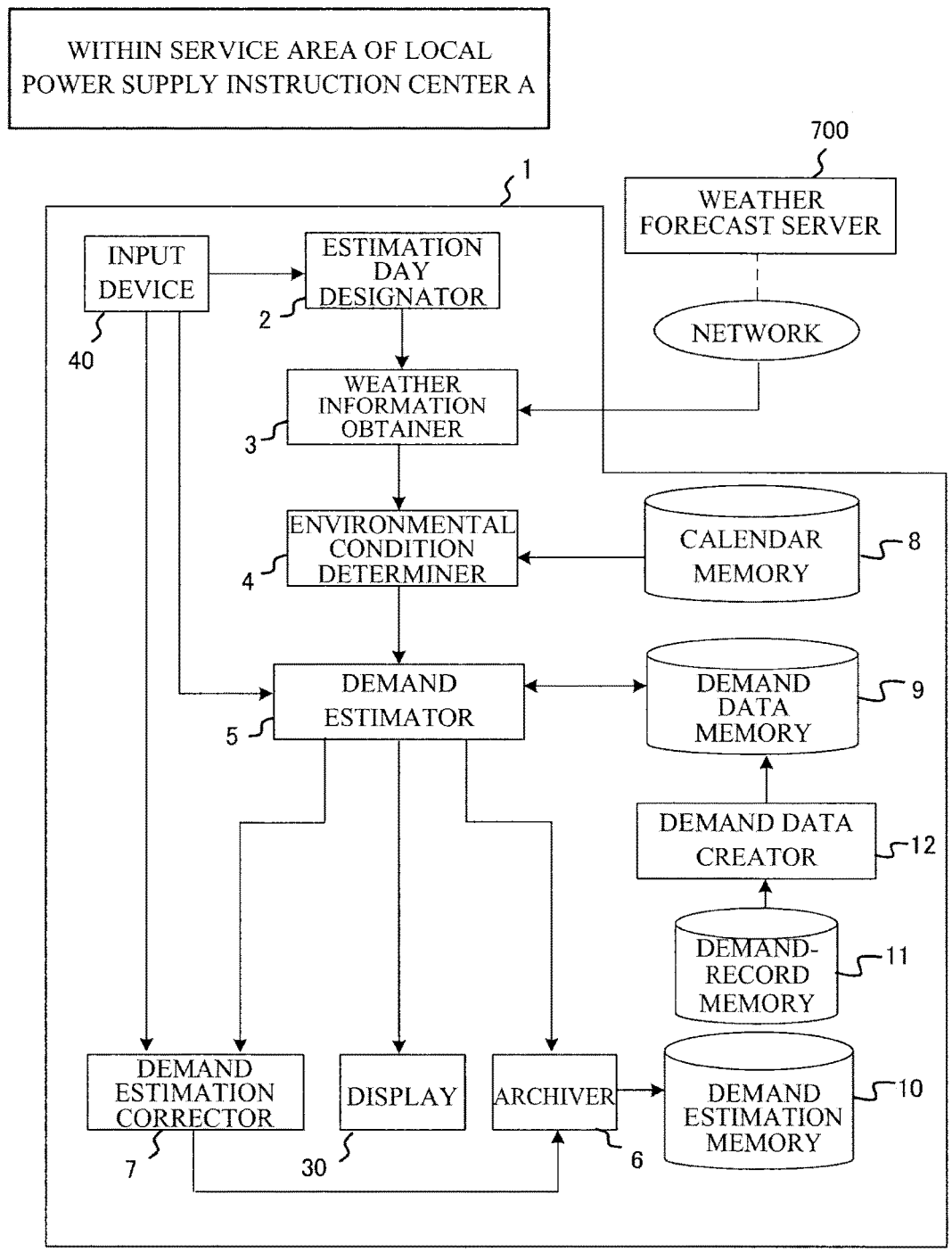
FIG. 10 is a block diagram illustrating a structure of a power demand estimating apparatus according to a second embodiment.

As illustrated in FIG. 10, the power demand estimating apparatus 1 further includes, in addition to the structure explained in the first embodiment, a demand record memory 11 that stores past demand record data of the area subjected to a demand estimation, and a demand data creator 12 that creates data for a demand estimation from the demand record data.

The demand record memory 11 stores past demand record data within the service area of the local power supply instruction center A subjected to the demand estimation. The demand record data is created by an unillustrated demand amount measuring device that measures the power demand amount per a unit time within the service area of the local power supply instruction center A. The created demand record data is stored in the demand record memory 11 via a network at a predetermined cycle or in accordance with a selection given by the user.

Figure 11:
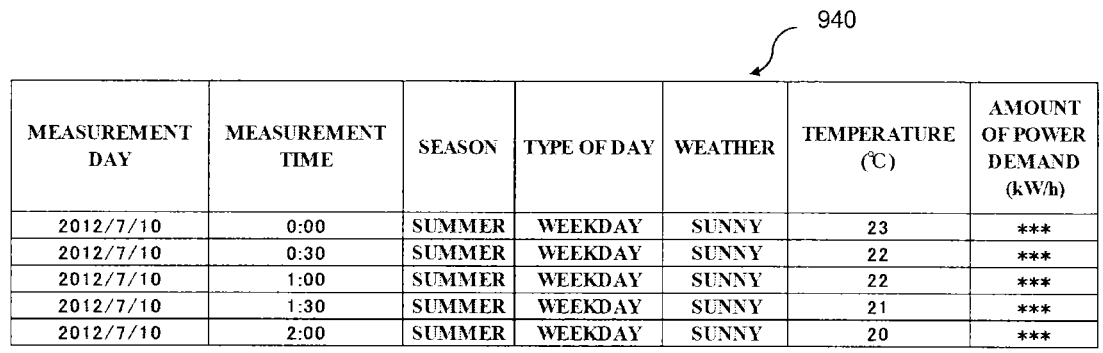
FIG. 11 is a diagram illustrating example demand record data stored in a demand record memory.

FIG. 11 illustrates an example demand record stored in the demand record memory 11. Demand record data 940 contains the power demand amount measured per a unit time, a measurement day, and a measurement time. In addition, this data contains the environmental conditions, such as a season, a type of day, and a weather, and a temperature at the measurement time.

The demand data creator 12 creates data for a demand estimation on the basis of the power demand pattern 910 and the power demand amount data per temperature 920 from the demand record data 940 stored in the demand record memory 11. The data for the demand estimation can be created when the demand record data 940 of one day is obtained, but also can be collectively created from the demand record data 940 of a predetermined time period. As for the timing at which the data is created, the data can be created when the demand record data 940 is obtained from the unillustrated demand amount measuring device at a predetermined cycle, or the data for the demand estimation may be created based on arbitrary demand record data 940 selected by the user through the input device 40.

The power demand pattern 910 can be created through the same way as that of the above-explained first embodiment. When the demand record data 940 to be created is by what corresponds to a day, simply, the peak demand amount of a day is set as the demand rate 100%, and the bottom demand amount is set as the demand rate 0%, and, the demand rate of each demand amount between those values is obtained with reference to those values, thereby creating the power demand pattern 910.

When the demand record data 940 subjected to the creation of the power demand pattern 910 is by what corresponds to several days, first, the demand record data 940 is classified in accordance with the environmental conditions. That is, the demand record data 940 is classified into a group that has the same types which are the "season", the "type of day", and the "weather".

Even the measurement time is the same, the power demand amount may differ and there may be variability within the group classified in accordance with the environmental conditions. In this case, an average value of the power demand amounts at the same measurement time may be obtained. Alternatively, in order to let the power demand pattern 910 to have a margin, a center value and a variability width may be obtained through a distribution function process.

Figure 12A:
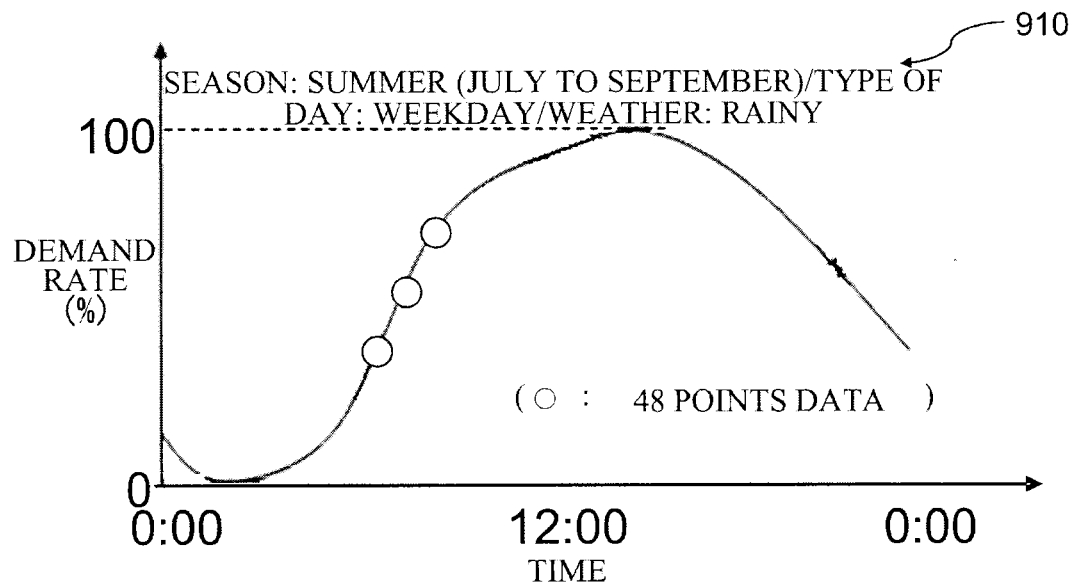
FIGS. 12A and 12B illustrate an example power demand pattern created based on the demand record data.
Figure 12B:
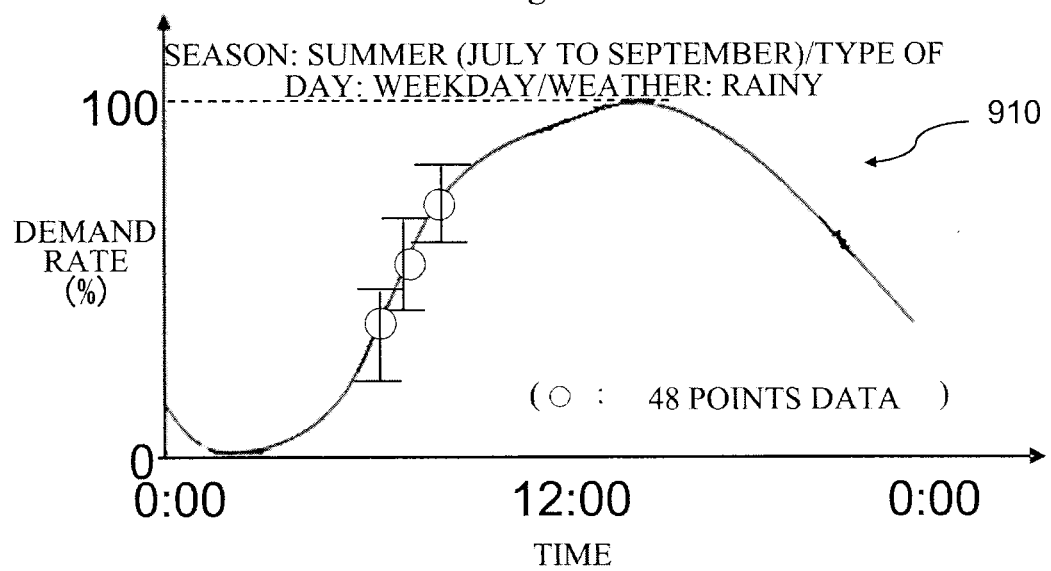

Next, among the measured times, the peak demand amount is set as a demand rate 100%, the bottom demand amount is set as a demand rate 0%, and, the demand rate at each measurement time is obtained with reference to those values. When an averaging process is performed on the power demand amount at each measurement time, as illustrated in FIG. 12A, an averaged demand curve is created. When a distribution function process is performed on the power demand amount at each measurement time, as illustrated in FIG. 12B, a boxplot is created.

The demand data creator 12 stores, in the demand data memory 9, the power demand pattern 910 created in this way. When the power demand pattern 910 classified in the same environmental conditions has been already stored in the demand data memory 9, the conventional data may be overwritten to update the data. Alternatively, the newly created data may be stored as new data, and the power demand estimating apparatus may enable the user to select the data that is expected as a further similar power demand pattern 910 at the time of demand estimation.

The power demand amount data per temperature 920 may be created through the same way as that of the above-explained first embodiment. The highest temperature, and the maximum and minimum values of the power demand amount are extracted from the demand record data 940 for each measurement day, and are collected up. As for the lowest temperature, likewise, the maximum value and minimum value of the power demand amount are extracted and collected up. Next, the maximum power demand amount and minimum power demand amount at each temperature are linked together, thereby creating the demand curve that shows the power demand amount per temperature.

When the demand record data 940 subjected to a creation is of several days, even if the highest temperature or the lowest temperature is the same, the maximum value and minimum value of the power demand amount may differ, and there may be variability. In this case, the average value of the power demand amounts may be obtained the same temperature by the same temperature. Alternatively, a larger value may be selected for the maximum demand amount, and a smaller value may be selected for the minimum demand amount. Still further, in order to cause the power demand amount data to have a margin, a center value and a variability width may be obtained through a distribution function process.

The demand data creator 12 stores, in the demand data memory 9, the power demand amount data per temperature 920 created in this way. In this case, the conventional data stored in the demand data memory 9 may be overwritten to update the data. Alternatively, the newly created data may be stored as new data, and the power demand estimating apparatus may enable the user to select the data that is expected as a further similar power demand amount data per temperature 920 at the time of demand estimation.

The demand data memory 9 stores the power demand pattern 910 and the power demand amount data per temperature 920 created based on the past demand record data 940 within the service area of the local power supply instruction center A that is an area subjected to the demand estimation, and the demand estimator 5 creates the demand estimating model through the same way as that of the first embodiment using those pieces of data.

As explained above, according to this embodiment, the demand data creator 12 that creates the demand-estimating-data from the demand record data 940 is provided, thereby improving the accuracy of the demand estimation as needed. When, for example, the accumulated demand record is insufficient, and the demand record data 940 is not directly applicable to the demand estimation, by partially reflecting such demand record, the reliability of the demand estimation can be improved.

[3. Third Embodiment]

Next, a third embodiment will be explained. In this embodiment, in addition to the demand estimation using the power demand pattern 910 and the power demand amount data per temperature 920 explained in the first embodiment, a demand estimation is performed by directly applying the demand record data of the area subjected to the demand estimation as explained in the second embodiment.

Like the second embodiment, the power demand estimating apparatus 1 of this embodiment includes the demand record memory 11. The demand record memory 11 stores, as illustrated in FIG. 11, the demand record data 940 that contains the power demand amount measured per a unit time, the measurement day, the measurement time, the environmental conditions, and the temperature at the measurement time.

In this embodiment, the demand is estimated using the detailed demand record data 940 gathered up per a unit time. Hence, it is desirable that the weather information obtainer 3 should obtain detailed weather information per a unit time on the estimation day. Hence, the demand record data 940 that is most similar to each unit time on the estimation day can be selected to estimate the demand.

In addition to the power demand pattern 910 and the power demand amount data per temperature 920 explained in the first embodiment, the demand data memory 9 stores, the following data as illustrated in FIG. 13.

Plural power-demand fluctuation pattern 950 (hereinafter, also simply referred to as a "power-demand fluctuation pattern") that shows a power-demand fluctuation rate per a unit time due to a temperature change.

FIG. 13 illustrates an example power-demand fluctuation pattern 950. The power-demand fluctuation pattern 950 collects up, for each predetermined time period, the power-demand fluctuation rate per a unit time due to a temperature change, and shows a transition in the power-demand fluctuation rate per a unit time. For example, it can be data that collects up, day by day, the power-demand fluctuation rate when the temperature changes by 1° C. for each 30 minutes.

Like the power demand pattern 910, the power-demand fluctuation pattern 950 differs in accordance with the environmental conditions, and thus the demand data memory 9 stores the plural power-demand fluctuation pattern 950 classified in accordance with the environmental conditions.

Figure 13A:
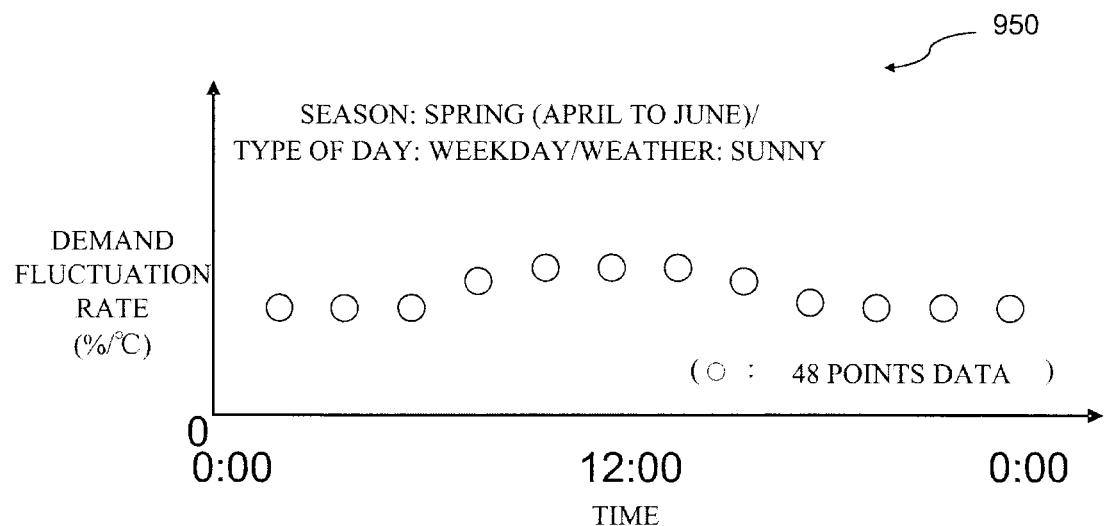
FIGS. 13A and 13B illustrate an example power-demand fluctuation pattern stored in a demand data memory according to a third embodiment.
Figure 13B:
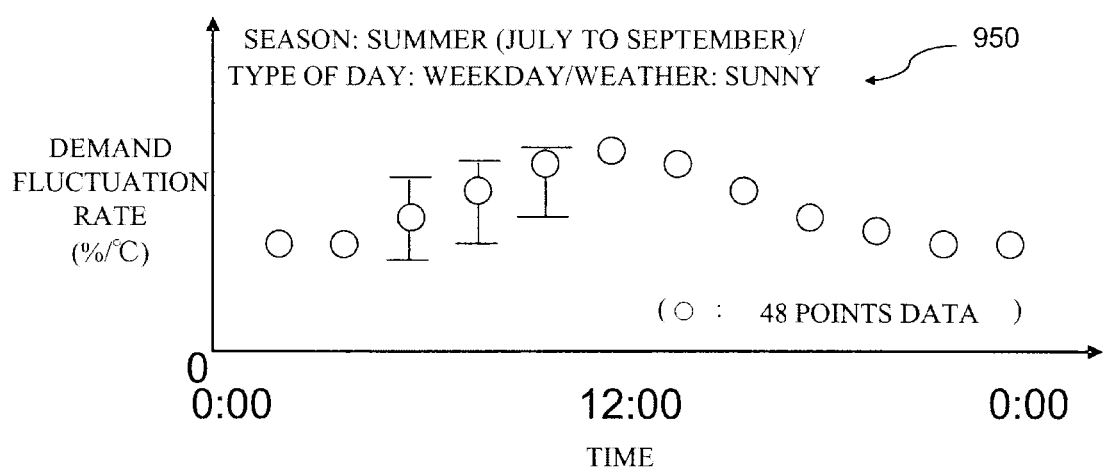

FIG. 13A illustrates the power-demand fluctuation pattern 950 created in accordance with the environmental conditions that are the "season: spring", the "type of day: weekday", and the "weather: sunny", and FIG. 13B illustrates the power-demand fluctuation pattern 950 created in accordance with the environmental conditions that are the "season: summer", the "type of day: weekday", and the "weather: sunny".

As for the power-demand fluctuation pattern 950, conventional data may be prepared and stored in the demand data memory 9 beforehand. Alternatively, the demand data creator 12 explained in the second embodiment may create the power-demand fluctuation pattern from the demand record data 940 within the service area of the local power supply instruction center A and stored in the demand record memory 11.

As for the creation scheme of the power demand pattern 950, first, as explained in the second embodiment, the demand data creator 12 classifies the demand record data 940 in accordance with the environmental conditions, thereby creating the power demand pattern 910. In addition, by calculating the power-demand fluctuation per a unit time when the temperature changes by 1° C. using the measurement temperature per a unit time, the power-demand fluctuation pattern 950 can be created. When an averaging process is performed at the time of creating the power demand pattern 910, as illustrated in FIG. 13A, an averaged demand curve is created. When a distribution function process is performed at the time of creating the power demand pattern 910, as illustrated in FIG. 13B, a boxplot is created.

The demand data creator 12 stores, in the demand data memory 9, the power-demand fluctuation pattern 950 created as explained above.

Figure 14:
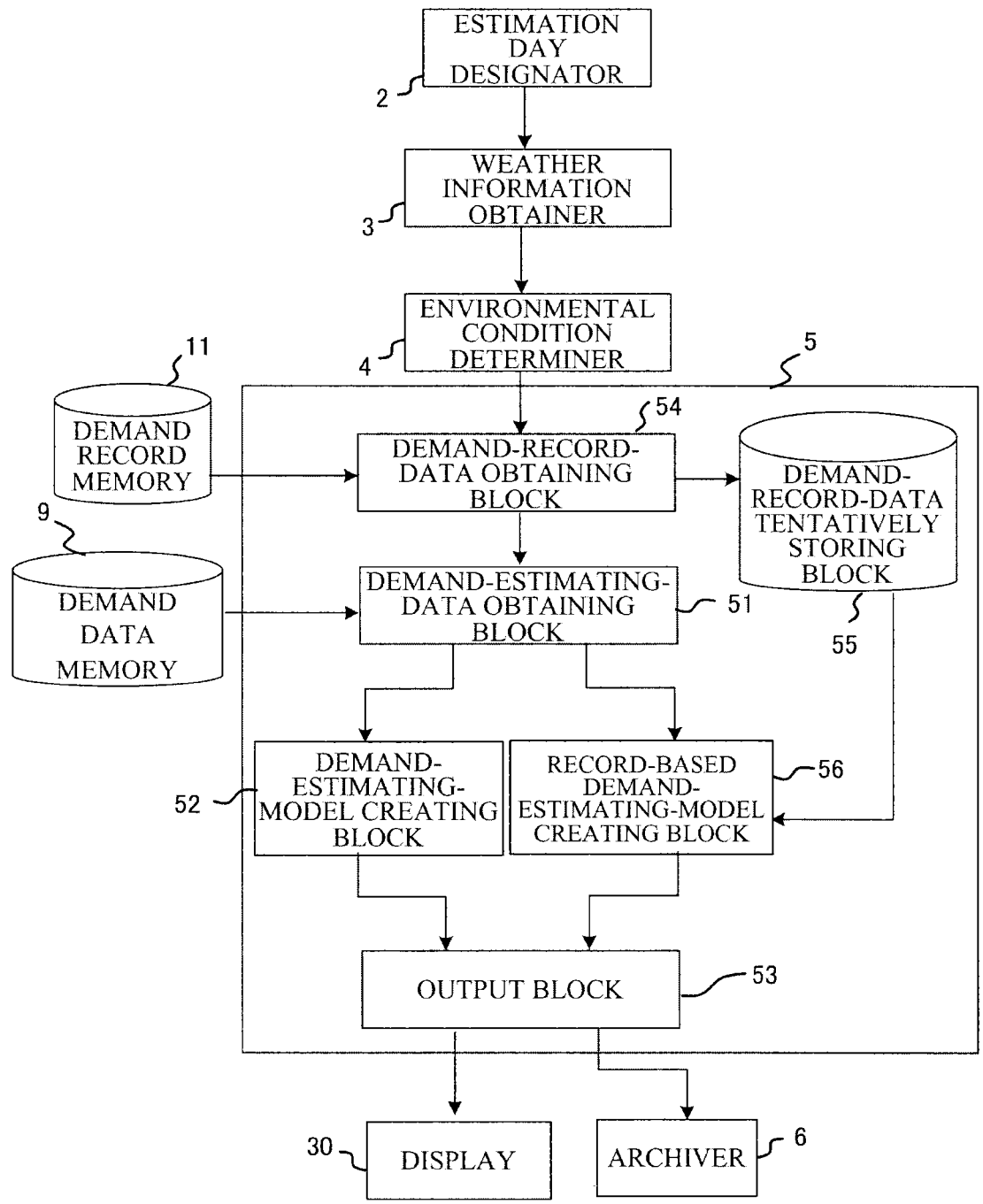
FIG. 14 is a block diagram illustrating a structure of a demand estimator of a power demand estimating apparatus according to the third embodiment.

Still further, in this embodiment, the demand estimator 5 includes, in addition to the structure explained in the first embodiment and the second embodiment, as illustrated in FIG. 14, a demand-record-data obtaining block 54, a demand-record-data tentatively storing block 55, and a record-based demand-estimating-model creating block 56. According to such a structure, the demand estimating apparatus can selectively perform a demand estimation using the power demand pattern 910 and the power demand amount data per temperature 920, and a demand estimation using the demand record data 940 and the power-demand fluctuation pattern 950.

Note that as for the demand-estimating-model creating block 52, in order to distinguish it from the record-based demand-estimating-model creating block 56, in this embodiment, it will be referred to as a pattern-based demand-estimating-model creating block 52.

The demand-record-data obtaining block 54 refers to the demand record memory 11, searches the demand record data 940 similar to the environmental conditions on the estimation day, obtains such data when there are pieces of such data, and stores the obtained data in the demand-record-data tentatively storing block 55.

More specifically, the demand-record-data obtaining block 54 determines a search target time period of the demand record data 940 based on the estimation day designated by the estimation day designator 2. The search target time period can be set arbitrarily, but in order to refine the search result of the demand record data 940 similar to the estimation day, for example, data of 30 days before and after the estimation day up to the three years ago from the estimation day can be set as the search target time period.

The demand-record-data obtaining block 54 searches data that matches the search target time period, and extracts data similar to the environmental conditions on the estimation day determined by the environmental condition determiner 4. More specifically, data that matches the season, the type of day, and the weather with those of the estimation day is extracted. The demand record data 940 may have a different weather depending on the measurement time even if the measurement day is the same, but when at least the weather is the same as that of the estimation day among the demand record data 940 at the same measurement day, such data may be taken as an extraction target.

The demand-record-data obtaining block 54 temporarily stores, in the demand-record-data tentatively storing block 55, the extracted demand record data 940 as a candidate to be utilized for the demand estimation. When the demand record data 940 by what corresponds to several days are extracted, the demand record data 940 to be obtained may be refined. This refinement may be carried out by selecting the demand record data 940 obtained through the input device 40 by the user. Alternatively, among the pieces of extracted demand record data 940, only the demand record data 940 that has a difference between the measurement temperature and the expected highest temperature and the expected lowest temperature on the estimation day within a predetermined range may be automatically obtained.

When there is no demand record data 940 before and after the estimation day in the pieces of demand record data 940, or when there is no demand record data 940 that has the matching environmental condition, no demand record data 940 is obtained and stored.

When no demand record data 940 is obtained, the demand estimator 5 estimates the demand like the first embodiment using the power demand pattern 910 and the power demand amount data per temperature 920. Moreover, the demand-estimating-data obtaining block 51 obtains, from the demand data memory 9, the power demand pattern 910 and the power demand amount data per temperature 920 in accordance with the environmental conditions on the estimation day and the weather information thereon. The pattern-based demand-estimating-model creating block 52 creates the demand estimating model using those pieces of data, the output block 53 outputs the created demand estimating model 930, and displays the output demand estimating model on the display 30.

Conversely, when the demand-record-data obtaining block 54 obtains the demand record data 940, the demand estimator 5 estimates the demand using the demand record data 940. In this case, the demand-estimating-data obtaining block 51 obtains, from the demand data memory 9, the power-demand fluctuation pattern 950 instead of the power demand pattern 910 and the power demand amount data per temperature 920. Among the plural power-demand fluctuation patterns 950 stored in the demand-estimating-data obtaining block 51, the power-demand fluctuation pattern 950 matching the environmental conditions on the estimation day is obtained.

Figure 15:
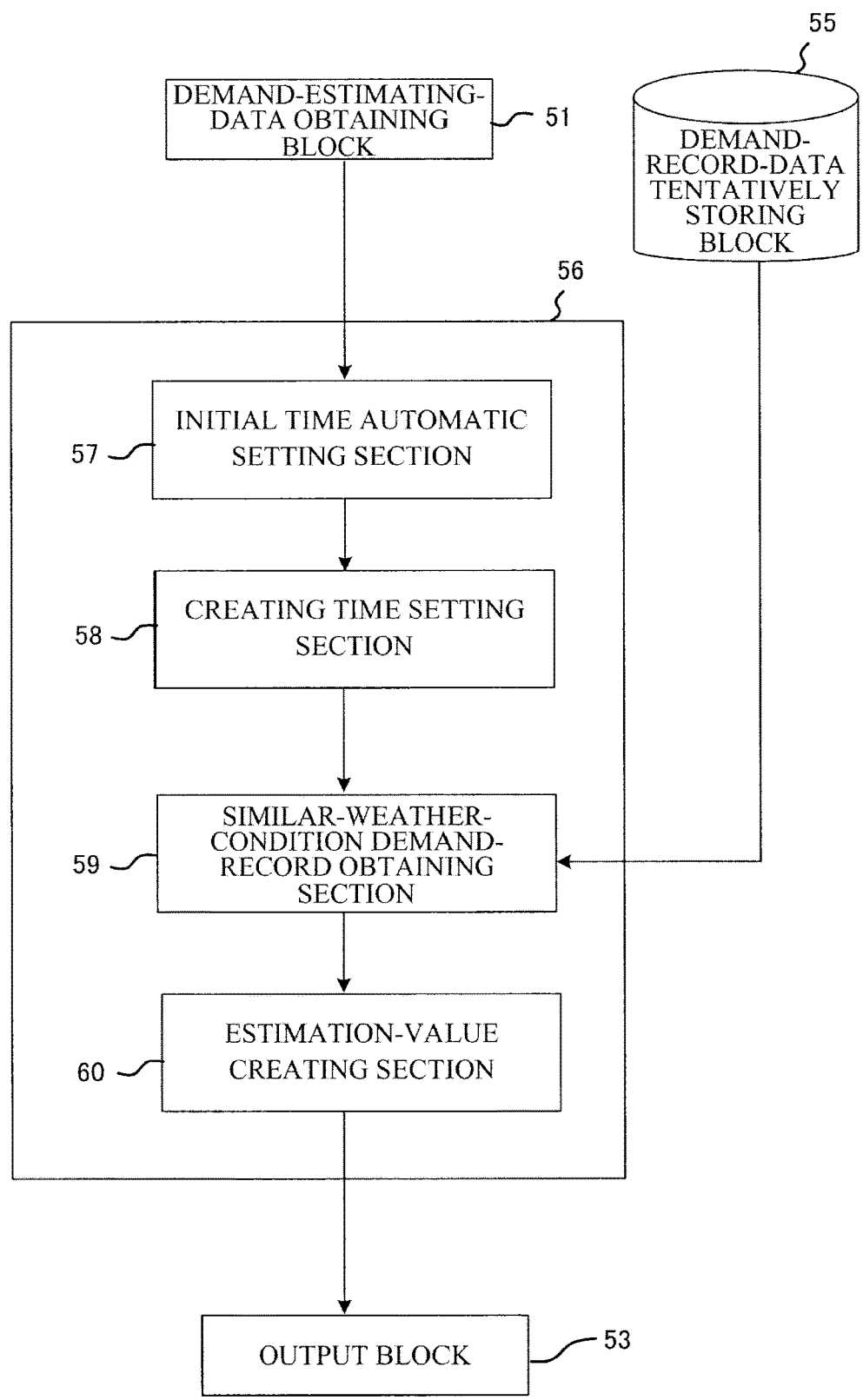
FIG. 15 is a block diagram illustrating a record-based demand-estimating-model creating block of the power demand estimating apparatus of the third embodiment.

The demand estimating model using those pieces of data is created by the record-based demand-estimating-model creating block 56 instead of the demand-estimating-model creating block 52. As illustrated in FIG. 15, the record-based demand-estimating-model creating block 56 includes an initial time automatic setting section 57, a creation time setting section 58, a similar-weather-condition demand-record obtaining section 59, and an estimation-value creating section 60. The record-based demand-estimating-model creating block 56 creates the demand estimation value per a unit time, and gathers up the created estimation values to finish the demand estimating model on the estimation day.

The initial time automatic setting section 57 sets the initial time at which the creation of the demand estimation value starts. The initial time can be set by the user through the input device 40, but may be automatically set to, for example, 0:00.

The creation time setting section 58 sets a unit of creation time for the demand estimation value. The creation time can be set by the user through the input device 40, but may be set in such a way that, like the unit time of the demand record, the demand estimation value is automatically created for each 30 minutes. That is, when the initial time of the demand estimation is 0:00, the next creation time becomes 0:30, and the final creation time becomes 23:30.

The similar-weather-condition demand-record obtaining section 59 obtains, from the pieces of demand record data 940 temporarily stored in the demand-record-data tentatively storing block 55, the demand record data 940 most similar to the weather information at each creation time. More specifically, the similar demand record data 940 is the demand record data 940 which has the measurement time matching with the creation time, has the weather at the time of measurement matching with the expected weather of the creation time, and has the smallest difference between the temperature at the time of measurement and the expected temperature at the creation time. When the humidity is also recorded as the demand record, and humidity information is also obtained from the weather information, a selection may be made in consideration of, in addition to the temperature difference, the humidity difference.

The estimation-value creating section 60 performs, on the similar demand record data 940 obtained by the similar-weather-condition demand-record obtaining section 59, a correction in consideration of the difference from the expected temperature at the creation time. In order to perform this correction, a correction coefficient is calculated from the power-demand fluctuation pattern 950.

As for the calculation of this correction coefficient, the record-based demand-estimating-model creating block 56 obtains the difference between the expected temperature at the creation time and the temperature of the demand record data 940. Next, the demand amount fluctuation rate when the temperature changes by 1° C. at the creation time is referred from the power-demand fluctuation pattern 950.

By multiplying this demand amount fluctuation rate by the difference of the expected temperature from the temperature of the demand record data 940, the correction coefficient for the power demand amount can be calculated. The record-based demand-estimating-model creating block 56 adds the calculated correction coefficient to the power demand amount of the demand record data 940. Hence, the estimation value of the power demand amount at the creation time and on the estimation day can be calculated.

When, for example, the estimation day is Aug. 5, 2013, and the creation time is 0:30, as the similar demand record data 940, the demand record data 940 that has the measurement day of Jul. 10, 2013, and the measurement time of 0:30 is obtained. The temperature in this demand record data 940 is 20° C. In contrast, the expected temperature at 0:30 and on Aug. 5, 2013, is 23° C. That is, the expected temperature of the estimation day has a difference of +3° C. from the temperature in the demand record. Hence, if the demand amount fluctuation rate when the temperature at 0:30 indicated in the power-demand fluctuation pattern 950 changes by 1° C. is 2%, 6% that is the triple of 2% becomes the correction coefficient. The value obtained by increasing the power demand amount at the measurement time of 0:30 by 6% is the estimation value of the power demand amount at 0:30 on Aug. 5, 2013.

The record-based demand-estimating-model creating block 56 repeats the above-explained process for each creation time, and creates the estimation value of each power demand amount, and, creates, as the demand curve that links the respective estimation values, the demand estimating model on the estimation day. The created demand estimating model is displayed on the display 30 by the output block 53 like the first embodiment. When the demand estimation is performed by the record-based demand-estimating-model creating block 56, the display 30 displays, together with the demand estimating model 930, the demand fluctuation pattern and the demand record data 940 which are the supports for the estimation.

Figure 16:
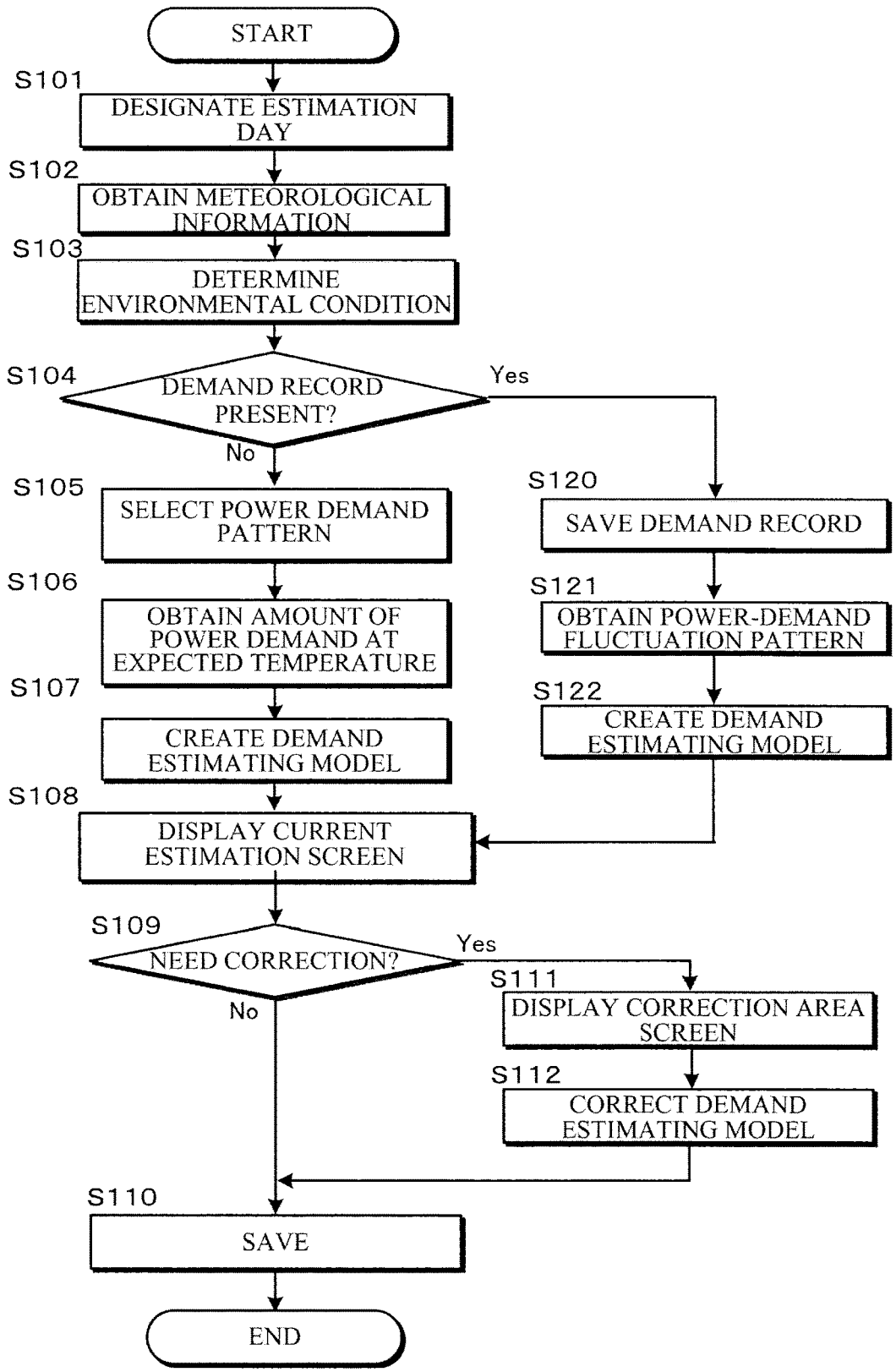
FIG. 16 is a flowchart illustrating a demand-estimating-model creating and correcting process by the power demand estimating apparatus of the third embodiment.

The action of the power demand estimating apparatus 1 of this embodiment will be explained with reference to the flowchart of FIG. 16. The duplicated part as that of the first embodiment will be skipped accordingly, and the explanation will be mainly given of a change between the demand estimation using the power demand pattern 910 and the power demand amount data per temperature 920, and, the demand estimation using the demand record data 940 and the power-demand fluctuation pattern 950.

Like the first embodiment, the estimation day designator 2 designates (step S101) the estimation day. Next, the weather information obtainer 3 obtains (step S102), from the weather estimation database via the network, the weather information on the estimation day designated by the estimation day designator 2. In this embodiment, detailed weather information per a unit time is obtained. When, for example, the estimation day is Aug. 5, 2013, the weather information up to 23:30 for every 30 minutes from 0:00 on Aug. 5, 2013, is obtained.

The environmental condition determiner 4 refers to the weather information obtained by the weather information obtainer 3 and the calendar stored in the calendar memory 8, and determines (step S103) the environmental conditions on the estimation day.

The demand-record-data obtaining block 54 of the demand estimator 5 searches the demand record data 940 stored in the demand record data memory, and when there is no similar demand record data 940 to the environmental conditions on the estimation day (step S104: No), like the first embodiment, the demand-estimating-data obtaining block 51 obtains the power demand pattern 910 and the power demand amount data per temperature 920, and the demand-estimating-model creating block creates (steps S105 to S107) the demand estimating model 930 based on those pieces of data.

Conversely, when there is a similar demand record data 940 to the environmental conditions on the estimation day (step S104: NO), this demand record data 940 is extracted and is stored (step S120) in the demand-record-data tentatively storing block 55.

Conversely, when the demand record data 940 is obtained by the demand-record-data obtaining block 54, the demand-estimating-data obtaining block 51 obtains (step S121), from the demand data memory 9, the power-demand fluctuation pattern 950 that matches the environmental conditions on the estimation day.

In the record-based demand-estimating-model creating block 56, the demand estimating model 930 is created (step S122) using the demand record data 940 and the power-demand fluctuation pattern 950. The action of the record-based demand-estimating-model creating block 56 has been already explained above, thus the explanation for the detail thereof will be omitted.

The output block 53 of the demand estimator 5 displays (step S108) the created demand estimating model 930 as the current estimation screen 31. In this case, when the demand estimating model is created using the power demand pattern 910 and the power demand amount data per temperature 920, the demand estimating model 930 is displayed together with those pieces of data. Conversely, when the demand estimating model 930 is created using the demand record data 940 and the power-demand fluctuation pattern 950, the demand estimating model 930 is displayed together with the demand record data 940 eventually selected by the similar-weather-condition demand-record obtaining section 59, and the power-demand fluctuation pattern 950.

When it is necessary to correct the demand estimating model 930, the correction is performed through the correction area screen 34 (steps S111 to S112). After the correction, the demand estimating model 930 is stored (step S110) in the demand estimation memory 10.

As explained above, according to this embodiment, the power demand estimating apparatus 1 includes the demand record memory 11 that stores the demand record obtained by classifying, in accordance with the environmental conditions, the power demand amount of the estimation target area measured per a unit time. In addition, the demand data memory 9 stores the plural power-demand fluctuation patterns 950 which show the demand fluctuation rate per a unit time due to a temperature change, and which are classified in accordance with the environmental conditions.

The demand estimator 5 extracts the demand record that matches the environmental conditions on the estimation day per a unit time from the demand record memory 11, and obtains the power-demand fluctuation pattern 950 that matches the environmental conditions on the estimation day from the demand data memory 9. Next, based on the difference between the temperature of the demand record and the expected temperature on the estimation day, the power demand amount in the demand record per a unit time is corrected using the power-demand fluctuation rate of the power-demand fluctuation pattern 950 per a unit time, thereby creating the demand estimating model 930 on the estimation day.

According to this structure, by directly applying the accumulated demand record data 940 to estimate the demand, the accuracy of the demand estimation is further improved.

In addition, when there is no demand record that is not applicable for the estimation day, the demand estimation using the power demand pattern 910 and the power demand amount data per temperature 920 is performed selectively, thereby further enhancing the user-friendliness.

[4. Fourth Embodiment]

A fourth embodiment will be explained. In the third embodiment, the weather information obtainer 3 obtains the detailed weather information on the estimation day per a unit time, and using the information on the expected temperature per a unit time contained in the weather information, the demand estimation is performed based on the demand record data 940. In this embodiment, an explanation will be given of an example case in which the number of weather information per a day is limited to one, and the weather forecasting information per a unit time is unobtainable, data is interpolated based on a preset weather pattern.

Figure 17:
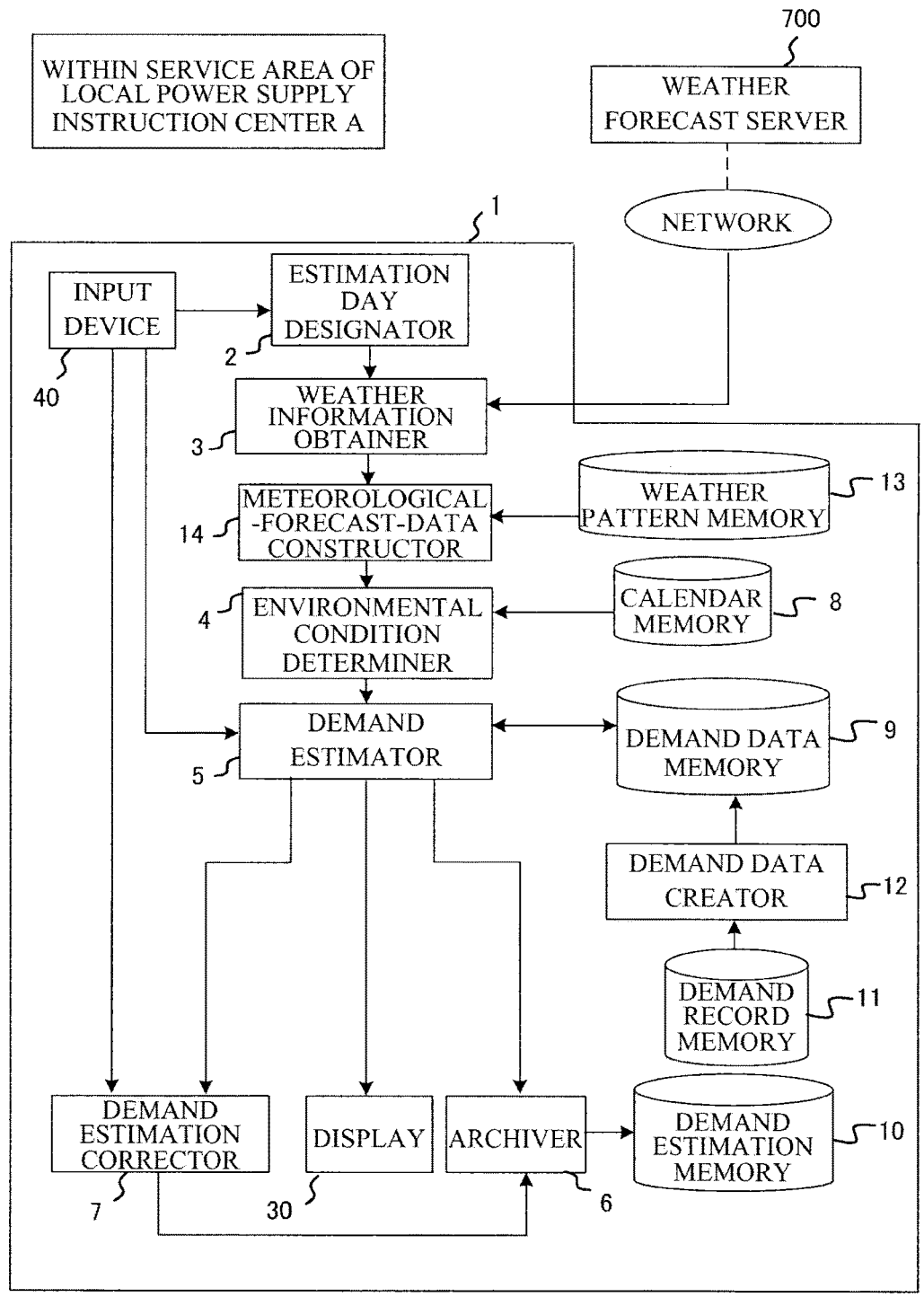
FIG. 17 is a block diagram illustrating a structure of a power demand estimating apparatus according to a fourth embodiment.

In this embodiment, the power demand estimating apparatus 1 further includes, as illustrated in FIG. 17, in addition to the structure of the above-explained embodiment, a weather pattern memory 13 that stores the weather pattern, and a weather forecasting data constructor 14 that creates weather forecasting data per a unit time using the weather information obtained from the external weather forecast server 700.

As explained above, according to this embodiment, the weather information obtainer 3 obtains apiece of weather information on a whole estimation day. When, for example, the estimation day is Aug. 5, 2013, the weather information obtainer 3 obtains the following weather information:

"Weather: sunny, and expected temperature at 12:00: 30° C."

Figure 18:
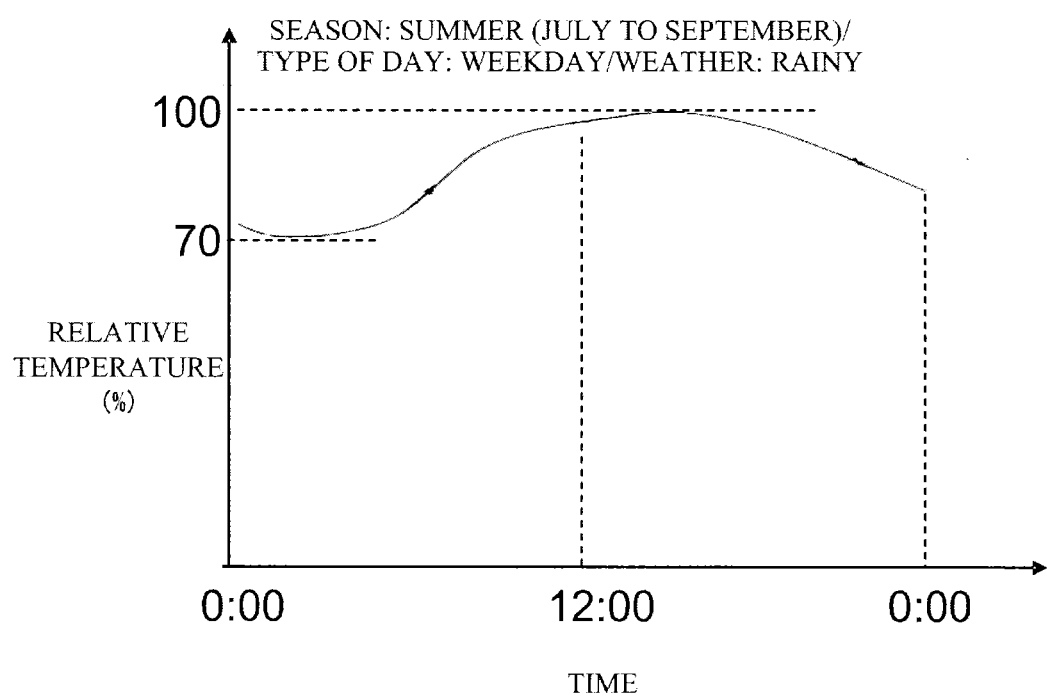
FIG. 18 is a diagram illustrating an example weather pattern stored in a weather pattern memory.

The weather forecasting data constructor 14 obtains, from the weather pattern memory 13, a weather pattern 960 in accordance with the designated estimation day and the weather information thereof based on the weather information obtained by the weather information obtainer 3. An example weather pattern 960 is data which is classified in accordance with a season, a weather, etc., and which shows an amount of relative change with time in the temperature. When the estimation day is Aug. 5, 2013, as illustrated in FIG. 18, the weather pattern 960 that shows an amount of relative change with time in the temperature when the season is "summer" and the weather is "rainy" is obtained.

The weather forecasting data constructor 14 applies the expected temperature contained in the weather information to this weather pattern 960. The expected temperature at 12:00 on the estimation day and obtained from the weather information is 30° C., and the relative temperature at 12:00 shown by the weather pattern 960 in FIG. 18 is 95%. Hence, by setting this 95% as 30° C., and by calculating the temperature for the relative temperature per a unit time, temperature information per a unit time which is necessary to estimate the demand can be created.

As explained above, according to this embodiment, even if the weather forecasting information per a unit time is unobtainable, by interpolating lacking data using a piece of weather forecasting information and the weather pattern 960, the weather forecasting data can be created, and thus an excellent user-friendliness can be provided. In the above-explained example, a case in which the temperature data is interpolated, but the humidity data can be interpolated through the same method.

[5. Fifth Embodiment]

A fifth embodiment will be explained. In the fifth embodiment, an example case in which the power demand estimating apparatus 1 of the above-explained embodiment is built in a demand suppressing schedule planning apparatus 90 will be explained.

The demand suppressing schedule planning apparatus 90 plans a demand suppressing schedule that is issued as a response to a power consumption reduction request from a power supplier, i.e., a so-called demand response (hereinafter, "DR"). The demand suppressing schedule means, more specifically, an amount of demand suppression, such as a load suppressing amount or a battery charging/discharging level, calculated based on a demand estimation, and an incentive menu selected to accomplish this amount of demand suppression.

In this embodiment, an explanation will be given of an example case in which the demand suppressing schedule planning apparatus 90 plans the demand suppressing schedule within the service area of the local power supply instruction center A in order to accomplish the reduction request contained in an operation schedule system issued by the central power supply instruction center. In addition, a solar power generation device is provided in the service area of the local power supply instruction center A, and the demand suppressing schedule planning apparatus 90 plans the demand suppressing schedule in consideration of the amount of generated power by this solar power generation device.

Figure 19:
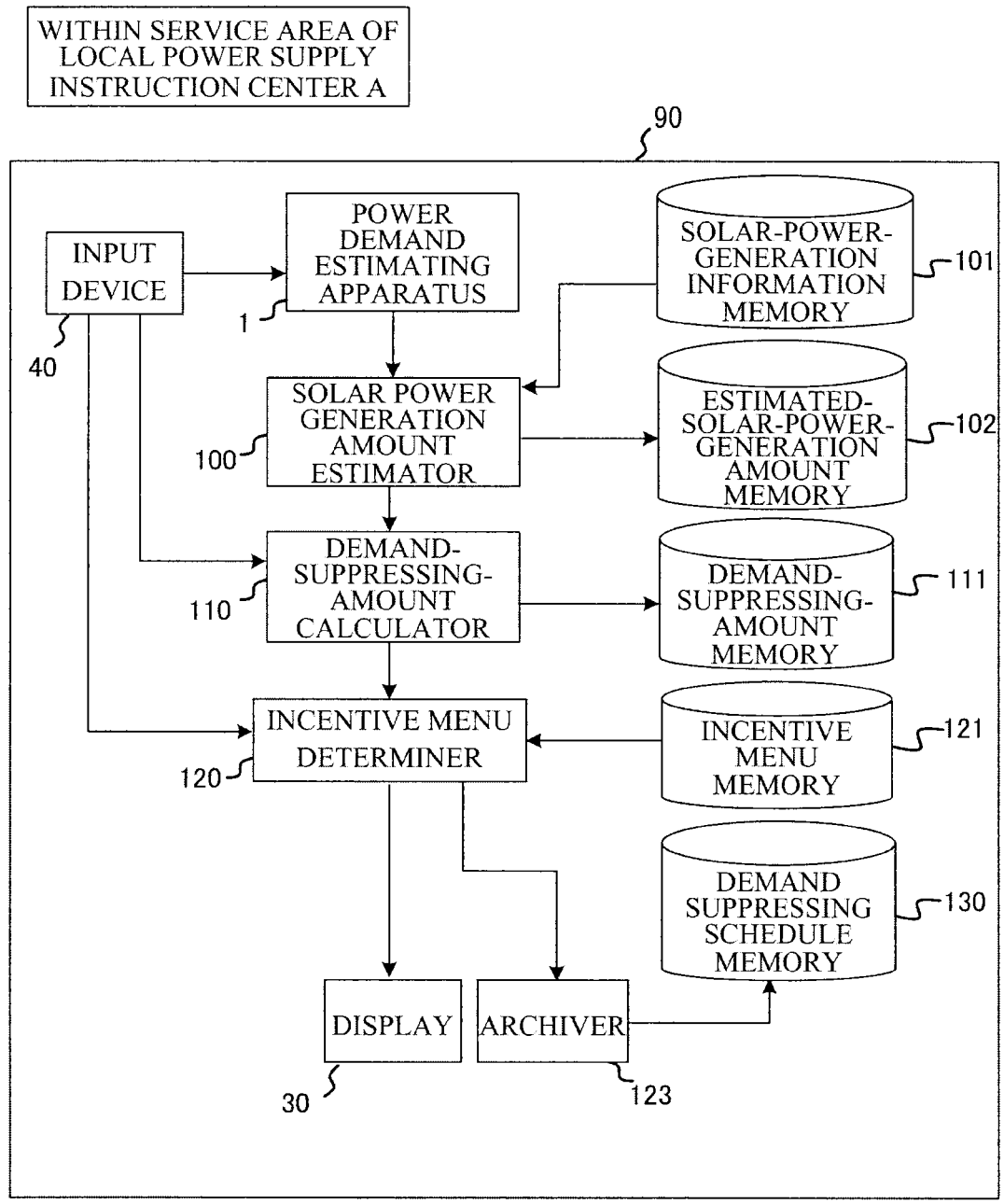
FIG. 19 is a block diagram illustrating a structure of a demand suppressing schedule planning apparatus according to a fifth embodiment.

As illustrated in FIG. 19, the demand suppressing schedule planning apparatus 90 includes the power demand estimating apparatus 1 and a solar power generation amount estimator 100. As explained in the above embodiments, the power demand estimating apparatus 100 estimates the power demand amount within the service area of the local power supply instruction center A. The solar-power-generation-amount estimator 100 estimates the amount of generated power by the solar power generation device provided in the service area of the local power supply instruction center A. The demand suppressing schedule planning apparatus 90 is provided with a solar-power-generation information memory 101 that stores solar-power-generation information obtained from the exterior through a network, and an estimated-solar-power-generation amount memory 102 that stores an estimated amount of solar power generation created by the solar-power-generation-amount estimator 100.

The demand suppressing schedule planning apparatus 90 further includes a demand-suppressing-amount calculator 110 that calculates an amount of demand suppression based on the demand estimation and the estimated amount of solar power generation, and a demand-suppressing-amount memory 111 that stores the amount of demand suppression determined by the demand-suppressing-amount calculator 110.

The demand-suppressing-amount calculator 110 calculates the amount of demand suppression using the estimation value stored in the demand estimation memory 10 of the demand estimator 5 and the estimation value stored in the solar power generation estimation memory.

The amount of demand suppression is a value obtained by subtracting the total value of the amount of solar power generation and an amount of purchased power from the demand estimation value, and is a suppressing amount necessary to accomplish the target value of the demand suppression. In this case, the amount of purchased power is a value determined in advance based on the operation schedule system from the central power supply instruction center. The calculated amount of demand suppression is stored in the demand-suppressing-amount memory 111.

The demand suppressing schedule planning apparatus 90 includes an incentive menu memory 121 that stores various incentive menus and the past records thereof, and an incentive menu determiner 120 that determines the incentive menu to be issued in accordance with the amount of demand suppression calculated by the demand-suppressing-amount calculator 110.

Example kinds of the incentive menu stored in the incentive menu memory 121 are as follows:

(a) TOU (Time of Use): a fee structure scheme that separates a time between a time slot with high power costs and a time slot with low power costs;

(b) CPP (Critical Peak Price): a fee structure scheme that sets a power peak day, and sets a further expensive fee to a specific time slot in the peak day;

(c) PTR (Peak Time Rebate): a scheme of paying a rebate by what corresponds to power consumption and reduction in a designated time slot;

(d) L-PTR (Limited-PTR): the PTR with an upper limit; and (e) CCP (Capacity Committed Program): a scheme of paying a rebate when the target value of an amount of power suppression is accomplished.

Those incentive menus are stored together with respective pieces of past record information that show how much the power amount was suppressed at the same cost.

The incentive menu determiner 120 determines, among those incentive menus stored in the incentive menu memory 121, the incentive menu which can minimize the costs for a power generation company, and which can also suppress the demand. More specifically, based on the recorded value for each incentive menu stored in the incentive menu memory 121, the incentive menu that can minimizes the costs is selected.

Next, necessary costs for a day when the incentive menu is issued are calculated from the amount of demand suppression per a unit time, e.g., for each 30 minutes on the estimation day which is stored in the demand-suppressing-amount memory 111. When the calculated costs are within a preset budget, the incentive menu is settled. When the calculated costs exceeds the preset budget, an adjustment is made which changes the total amount of budget or changes the value of the demand suppression amount that can be accomplished within the budget. As for this adjustment, the current demand suppression amount and the incentive menu may be both displayed on the display 30, and the user may instruct, through the input device 40, a change to those pieces of data.

The demand suppressing schedule planning apparatus 90 includes a demand-suppressing-schedule memory 130. A demand suppressing schedule that includes the incentive menu and the estimated demand amount determined eventually is stored in the demand-suppressing-schedule memory 130.

As explained above, the demand suppressing schedule planning apparatus 90 of this embodiment is equipped with the demand estimating apparatus of the above-explained embodiment. Hence, an appropriate incentive menu can be selected based on a highly reliable demand estimation, and thus the accuracy of the demand suppressing schedule planning can be improved.

[6. Other Embodiments]

(1) As for the power demand estimating method and the demand suppressing schedule planning method explained in the above embodiments, a program that can be executed by a computer may be stored in a non-transitory storage medium, such as a magnetic disk, an optical disk (e.g., CD-ROM or DVD), a magneto-optical disk, or a semiconductor memory, for distribution.

(2) In the demand suppressing schedule planning apparatus 90 equipped with the power demand estimating apparatus 1 explained in the above embodiments, the details of the created demand suppressing schedule may be reflected on the demand estimation, and the estimated demand amount may be corrected. In order to accomplish this operation, the apparatus includes a DR-effect estimation memory that stores a demand fluctuation pattern caused by an issued incentive, and a DR-effect estimator that corrects the demand estimation created in advance using those pieces of information. Accordingly, the estimated demand amount that is calculated in consideration of the demand suppressing schedule can be corrected, and thus the reliability at the time of demand estimation and of creation of the demand suppressing schedule can be further improved.

(3) In addition, the demand suppressing schedule planning apparatus 90 may include an environmental-improvement-effect calculator that calculates an environmental improvement effect by the demand suppressing schedule through an environmental impact evaluation scheme like LCA. The environmental-improvement-effect calculator calculates, based on an amount of solar power generation (kWh/day) within the service area of the local power supply instruction center A and an energy saving amount (kWh/day) of a day to be accomplished by the demand suppressing schedule, a $CO_2$ reduction amount, and displays the calculated reduction amount. By displaying this environmental improvement effect together with the demand suppressing schedule on the display screen, the user can know the advantage for an environmental improvement at the time of planning the demand suppressing schedule.

(4) In the above-explained embodiments, the demand suppressing schedule planning apparatus 90 plans the demand suppressing schedule in consideration of the amount of generated power by solar power generation, but the demand suppressing schedule planning apparatus may consider, not only solar power generation but also the amount of generated power by the other power generation facilities, such as wind power generation and water power generation, and the discharging amount of batteries. When, for example, batteries are provided in the service area of the local power supply instruction center A, the amount of demand suppression becomes a value obtained by subtracting the total value of the solar power generation amount, the amount of purchased power, and the amount of battery discharging amount from the demand estimation value.

(5) The embodiments of the present disclosure are not limited to the aforementioned embodiments as those are, and modifications can be made to the components in an actual practice circumstance to embody the present disclosure without departing from the scope and spirit of the present disclosure. In addition, various species of the present disclosure can be made by combining the multiple components disclosed in the aforementioned embodiments as needed. For example, some components may be eliminated from all components exemplified in the embodiments. Still further, components from different embodiments may be combined as needed. For example, the following embodiments are also within the scope of the present disclosure.

LIST OF REFERENCE SIGNS

1 Power demand estimating apparatus
2 Estimation day designator
3 Weather information obtainer
4 Environmental condition determiner
5 Demand estimator
6 Archiver
7 Demand estimation corrector
8 Calendar memory
9 Demand data memory
10 Demand estimation memory
11 Demand record memory
12 Demand data creator
13 Weather pattern memory
14 Weather forecasting data constructor
30 Display
31 Current estimation screen
32 Save button
33 Correct button
34 Correction area screen
35 Correction display part
36 Correction end button
40 Input device
51 Demand-estimating-data obtaining block
52 Demand-estimating-model creating block (Pattern-based demand-estimating-model creating block)
53 Output block
54 Demand-record-data obtaining block
55 Demand-record-data tentatively storing block
56 Record-based demand-estimating-model creating block
57 Initial time automatic setting section
58 Creation time setting section
59 Similar-weather-condition demand-record obtaining section
60 Estimation-value creating section
90 Demand suppressing schedule planning apparatus
100 Solar power generation amount estimator
101 Solar-power-generation information memory
102 Estimated-solar-power-generation amount memory
110 Demand-suppressing-amount calculator
111 Demand-suppressing-amount memory
120 Incentive menu determiner
121 Incentive menu memory
130 Demand-suppressing-schedule memory
700 Weather forecast server
910 Power demand pattern
920 Power demand amount data per temperature
930 Demand estimating model
940 Demand record data
950 Power-demand fluctuation pattern
960 Weather pattern
A Local power supply instruction center

The invention claimed is:

1. A power demand estimating apparatus that estimates a power demand on a designated estimation day, the apparatus comprising:
a demand data memory storing:
a plurality of power demand patterns which are classified in accordance with an environmental condition, and which show a power demand rate per a unit time;
power demand amount data per temperature gathering up a maximum value and a minimum value of a power demand amount at each temperature; and
a plurality of power-demand fluctuation patterns which are classified in accordance with the environmental condition and which show a demand fluctuation rate per a unit time due to a temperature change;
a demand record memory storing a demand record, the demand record being obtained by classifying, in accordance with the environmental condition, the power demand amount at an area subjected to an estimation measured per a unit time;
a demand estimator selecting the demand pattern that matches the environmental condition on the estimation day from the demand data memory, obtaining the maximum value and the minimum value of the power demand amount at an expected temperature on the estimation day from the power demand amount data per temperature, calculating the power demand amount per a unit time on the estimation day, and creating a demand estimating model on the estimation day; and
a display displaying the demand estimating model on the estimation day together with the power demand pattern selected by the demand estimator,
wherein:
the demand estimator extracts, from the demand record memory, the demand record that matches the environmental condition per a unit time on the estimation day, and obtains, from the demand data memory, the power-demand fluctuation pattern that matches the environmental condition on the estimation day; and
the demand estimator corrects the power demand amount by obtaining a difference between the temperature of the demand record and an expected temperature on the estimation day, calculating a correction coefficient by multiplying the difference by a power demand fluctuation rate per a unit time in the power-demand fluctuation pattern, and adding the correction coefficient to the power demand amount per a unit time in the demand record, and creates the demand estimating model on the estimation day.

2. The power demand estimating apparatus according to claim 1, wherein:
the environmental condition is defined by a season, a type of day including a weekday or a non-work day, and, a weather; and
the environmental condition of the power demand pattern selected by the demand estimator is displayed on the display together with the power demand pattern.

3. The power demand estimating apparatus according to claim 1, wherein the power demand amount data per temperature is displayed on the display together with the demand estimating model on the estimation day and the power demand pattern selected by the demand estimator.

4. The power demand estimating apparatus according to claim 1, further comprising a demand estimation corrector that corrects the demand estimating model by correcting, based on an input given by a user, the power demand pattern displayed on the display, and creating again the demand estimating model on the estimation day using the power demand pattern that is corrected.

5. The power demand estimating apparatus according to claim 4, wherein the power demand pattern that is corrected is stored in the demand data memory.

6. The power demand estimating apparatus according to claim 1, further comprising:
 a weather pattern memory storing a plurality of weather patterns which are classified in accordance with the environmental condition, and which show a relative weather fluctuation rate per a unit time; and
 an weather forecasting data constructor obtaining, from the weather pattern memory, the weather pattern that matches the environmental condition on the estimation day, and creating weather forecasting data per a unit time on the estimation day.

7. A demand suppressing schedule planning apparatus comprising:
 the power demand estimating apparatus according to claim 1;
 a demand suppressing schedule calculator calculating an amount of power demand suppression at an area subjected to an estimation using the demand estimating model created by the power demand estimating apparatus; and
 an incentive menu determiner determining an incentive menu to accomplish the amount of power demand suppression.

8. The demand suppressing schedule planning apparatus according to claim 7, further comprising a demand-suppressing-effect estimator correcting, based on the amount of power demand suppression, the demand estimating model created by the power demand estimating apparatus.

9. The demand suppressing schedule planning apparatus according to claim 7, further comprising an environmental-improvement-effect calculator calculating an environmental improvement effect by the demand suppressing schedule.

10. A power demand estimating method which estimates a power demand on a designated estimation day, and which is executed by a computer accessible to a demand data memory storing:
 a plurality of power demand patterns which are classified in accordance with an environmental condition, and which show a power demand rate per a unit time;
 power demand amount data per temperature gathering up a maximum value and a minimum value of a power demand amount at each temperature; and
 a plurality of power-demand fluctuation patterns which are classified in accordance with the environmental condition and which show a demand fluctuation rate per a unit time due to a temperature change; and
 a demand record memory storing a demand record, the demand record being obtained by classifying, in accordance with the environmental condition, the power demand amount at an area subjected to an estimation measured per a unit time,
the method comprising:
 selecting the demand pattern that matches the environmental condition on the estimation day from the demand data memory, obtaining the maximum value and the minimum value of the power demand amount at an expected temperature on the estimation day from the power demand amount data per temperature, calculating the power demand amount per a unit time on the estimation day, and creating a demand estimating model on the estimation day; and
 displaying the demand estimating model on the estimation day together with the power demand pattern selected by the demand estimator,
wherein:
the selecting extracts, from the demand record memory, the demand record that matches the environmental condition per a unit time on the estimation day, and obtains, from the demand data memory, the power-demand fluctuation pattern that matches the environmental condition on the estimation day; and
 the selecting corrects the power demand amount per a unit time in the demand record by obtaining a difference between the temperature of the demand record and an expected temperature on the estimation day, calculating a correction coefficient by multiplying the difference by a power demand fluctuation rate per a unit time in the power-demand fluctuation pattern, and adding the correction coefficient to the power demand amount per a unit time in the demand record, and creates the demand estimating model on the estimation day.

11. A computer-accessible storage medium storing a power demand estimating program for estimating a power demand on a designated estimation day that causes a computer to realize:
 a function of accessing a plurality of power demand patterns which are classified in accordance with an environmental condition, and which show a power demand rate per a unit time, power demand amount data per temperature gathering up a maximum value and a minimum value of an power demand amount at each temperature, and a plurality of power-demand fluctuation patterns which are classified in accordance with the environmental condition and which show a demand fluctuation rate per a unit time due to a temperature change, the power demand patterns, the power demand amount data per temperature, and the plurality of power-demand fluctuation patterns being stored in a storage device;
 a function of accessing a demand record memory storing a demand record, the demand record being obtained by classifying, in accordance with the environmental condition, the power demand amount at an area subjected to an estimation measured per a unit time, and the demand record being stored in a storage device;
 a function of selecting the demand pattern that matches the environmental condition on the estimation day from the plurality of power demand patterns, obtaining the maximum value and the minimum values of the power demand amount at an expected temperature on the estimation day from the power demand amount data per temperature, calculating the power demand amount per a unit time on the estimation day, and creating a demand estimating model on the estimation day; and
 a function of creating display screen data displaying the demand estimating model on the estimation day together with the power demand pattern selected by the demand estimator,
wherein:
the function of selecting extracts, from the demand record memory, the demand record that matches the environmental condition per a unit time on the estimation day, and obtains, from the demand data memory, the power-demand fluctuation pattern that matches the environmental condition on the estimation day; and
 the function of selecting corrects the power demand amount per a unit time in the demand record by obtaining a difference between the temperature of the demand record and an expected temperature on the estimation day, calculating a correction coefficient by multiplying the difference by a power demand fluctuation rate per a unit time in the power-demand fluctuation pattern, and adding the correction coefficient to the power demand amount per a unit time in the demand record, and creates the demand estimating model on the estimation day.

* * * * *